(12) United States Patent
Houser

(10) Patent No.: US 12,109,655 B2
(45) Date of Patent: Oct. 8, 2024

(54) METAL FABRICATION LOCATOR DEVICE AND METHODS

(71) Applicant: Houser Products, LLC, Marion, OH (US)

(72) Inventor: Jeffrey David Houser, Marion, OH (US)

(73) Assignee: HOUSER PRODUCTS, LLC, Marion, OH (US)

( * ) Notice: Subject to any disclaimer, the term of this patent is extended or adjusted under 35 U.S.C. 154(b) by 0 days.

(21) Appl. No.: 17/968,262

(22) Filed: Oct. 18, 2022

(65) Prior Publication Data

US 2024/0123556 A1 Apr. 18, 2024

Related U.S. Application Data

(60) Provisional application No. 63/416,754, filed on Oct. 17, 2022.

(51) Int. Cl.
*B23K 37/053* (2006.01)
*B23K 33/00* (2006.01)
*B23K 101/24* (2006.01)

(52) U.S. Cl.
CPC .......... *B23K 37/053* (2013.01); *B23K 33/006* (2013.01); *B23K 2101/24* (2018.08)

(58) Field of Classification Search
CPC .... B23K 33/006; B23K 37/053; B23K 26/10; B23K 26/083; B23K 26/12; B23K 26/127;

(Continued)

(56) References Cited

U.S. PATENT DOCUMENTS 2,489,670 A * 11/1949 Powell, Jr. ............. B65D 90/08
52/282.4
2,708,786 A * 5/1955 Watson ................. B21D 53/86
228/155

(Continued)

FOREIGN PATENT DOCUMENTS

FR 2969249 A1 6/2012

OTHER PUBLICATIONS

Invitation to Pay Additional Fees and, Where Applicable, Protest Fee for International Patent Application No. PCT/US2023/035192 dated Dec. 1, 2023, 3 pages.

(Continued)

*Primary Examiner* — Dana Ross
*Assistant Examiner* — Adam M Eckardt
(74) *Attorney, Agent, or Firm* — Hahn Loeser & Parks LLP

(57) ABSTRACT

The present disclosure is for a metal fabrication locator device that is a plate, or other object as described herein, that is fastened to the tangent face of a receiving tube. A mating tube may then slide over the metal fabrication locator device such that the perimeter of the metal fabricator locator device biases the inside sidewall of the mating tube to precisely align it on the receiving tube. This eliminates the use of additional weld fixtures for positioning of tube members in a metal fabrication assembly. This also allows an end user to construct and weld a product together on their own with precise assembly. Also disclosed herein are methods of manufacture and assembly of a metal fabrication assembly using a metal fabrication locator device.

20 Claims, 22 Drawing Sheets

(58) Field of Classification Search
CPC .... B23K 26/22; B23K 26/38; B23K 37/0533; B23K 31/02; B23K 37/06; B23K 2101/06; B23K 2101/12; B23K 9/0358; B23K 2101/10; B23K 2101/24; B23K 37/0443; B23K 2103/04; B23K 2103/50; B23K 26/0884; B23K 26/262; B23K 26/32; B23K 33/004; B23K 37/0229; B23K 9/0286; B23K 1/0008; B23K 2101/006; B23K 2101/04; B23K 26/28; B23K 31/027; B23K 33/00; B23K 33/002; B23K 33/008; B23K 35/286; B23K 35/302; B23K 37/0536; B23K 37/0538; B23K 9/0203; B23K 9/0282; A61F 2/91; A61F 2/915; A61F 2002/91541; A61F 2002/91558; A61F 2230/0054; A61F 2/06; B21F 45/008; Y10T 428/12188; Y10T 428/12201; Y10T 428/12229; Y10T 428/12368; Y10T 428/12493; Y10T 403/479; Y10T 403/478; A61M 29/00; B29C 65/02; B29C 65/14; B29C 65/20; B29C 65/7817; B29C 65/7841; B29C 66/1142; B29C 66/5221; B29C 66/52231; B29C 66/52241; B29C 66/52251; B29C 66/71; B29C 66/73921; B29C 66/8246; B29L 2023/00; E04H 7/06; F16L 2201/60; F16L 47/02; F16L 23/032; F16L 23/00; B07B 1/15; B07B 1/46; B21C 37/08; B21D 5/10; B23B 47/281; B23P 13/02; B23P 23/02; F16B 43/02; F16B 5/12; F16B 9/01; F16B 9/056; F16B 9/09; B29K 2023/12; B29K 2027/06; B29K 2027/12; B29K 2059/00; B29K 2071/00; B60G 2204/128; B60G 2204/16; B60G 2204/43; B60G 2206/604; B62D 21/09; B62D 24/02; B62D 27/023; B62D 25/20; B62D 27/00; B62D 27/02; C21D 2221/00; C21D 6/002; C21D 6/004; C21D 8/105; C21D 9/08; C21D 9/50; C22C 19/03; C22C 38/00; C22F 1/10

USPC .......... 205/651, 686; 220/584; 248/220.21, 248/231.21, 231.9; 280/781; 285/133.11, 285/179, 288.1, 405, 416; 296/29; 403/271; 623/1.15; 228/182

See application file for complete search history.

(56) References Cited

U.S. PATENT DOCUMENTS

| | | | | |
|---|---|---|---|---|
| 2,880,021 | A * | 3/1959 | White | F16B 7/00 403/272 |
| 3,742,186 | A * | 6/1973 | Finkel | B23K 37/0531 219/160 |
| 4,238,117 | A * | 12/1980 | Newman | B23K 33/006 256/65.1 |
| 4,258,247 | A * | 3/1981 | Shimada | B23K 9/162 219/137 R |
| 4,274,621 | A * | 6/1981 | Illakowicz | B23B 5/16 266/61 |
| 4,351,469 | A * | 9/1982 | Newman | B23K 33/006 256/65.1 |
| 4,410,783 | A * | 10/1983 | Pease | B23K 9/208 219/98 |
| 4,424,434 | A | 1/1984 | Pease et al. | |
| 4,497,428 | A * | 2/1985 | Baumann | B23K 1/20 228/175 |
| 4,615,514 | A * | 10/1986 | Hamlin | B23K 37/053 269/49 |
| 5,040,716 | A * | 8/1991 | Stetz | B23K 37/053 269/95 |
| 5,332,281 | A * | 7/1994 | Janotik | B62D 21/02 52/696 |
| 5,404,682 | A * | 4/1995 | West | E01F 9/642 52/114 |
| 5,458,428 | A * | 10/1995 | West | E04C 3/30 403/252 |
| 5,482,323 | A * | 1/1996 | Hicks | B62D 21/14 29/401.1 |
| 5,966,308 | A * | 10/1999 | Kazirskis | B23K 9/1062 219/61.4 |
| 6,000,719 | A * | 12/1999 | Kocer | B23K 33/008 296/29 |
| 6,010,182 | A * | 1/2000 | Townsend | B64C 1/08 296/29 |
| 6,131,286 | A * | 10/2000 | Kelly | F16B 17/008 29/513 |
| 6,247,633 | B1 * | 6/2001 | White | B23K 20/123 228/2.1 |
| 6,346,684 | B1 | 2/2002 | Gabbianelli et al. | |
| 6,566,624 | B2 | 5/2003 | Gabbianelli et al. | |
| 6,621,037 | B2 * | 9/2003 | Gabbianelli | B23K 11/14 219/94 |
| 6,689,982 | B2 * | 2/2004 | Gabbianelli | B23K 11/0066 219/148 |
| 6,713,707 | B2 * | 3/2004 | Gabbianelli | B23K 11/34 219/94 |
| 6,860,512 | B2 * | 3/2005 | Lawson, Jr. | B62D 21/183 180/291 |
| 7,390,052 | B2 * | 6/2008 | Bertoch | B62D 21/20 296/156 |
| 7,448,820 | B1 * | 11/2008 | Faber | F16B 7/0453 403/263 |
| 7,654,571 | B2 * | 2/2010 | Gabbianelli | B23K 33/008 280/781 |
| 8,146,948 | B2 * | 4/2012 | Burns | B62D 21/16 280/124.157 |
| 9,095,935 | B1 * | 8/2015 | Watts | B23K 37/0461 |
| 9,534,723 | B2 * | 1/2017 | Steck | B23K 1/002 |
| 9,539,666 | B2 * | 1/2017 | Chen | B62D 23/005 |
| 11,097,383 | B2 * | 8/2021 | Arnold | F16B 9/01 |
| 11,634,060 | B2 * | 4/2023 | Bjerketvedt | B62D 47/003 296/64 |
| 2004/0045250 | A1 | 3/2004 | Takeuchi | |
| 2004/0055244 | A1 * | 3/2004 | Gimpel | G09F 15/0068 52/655.1 |
| 2004/0170472 | A1 | 9/2004 | Anderson | |
| 2004/0197508 | A1 * | 10/2004 | Zoellner | B29C 66/5221 428/36.9 |
| 2010/0310308 | A1 | 12/2010 | Connell et al. | |
| 2013/0034380 | A1 * | 2/2013 | Cutsforth | F16M 11/10 403/119 |
| 2014/0133904 | A1 * | 5/2014 | Somerfield | F16B 13/0833 403/350 |
| 2014/0353956 | A1 | 12/2014 | Bjerketvedt et al. | |
| 2016/0280163 | A1 * | 9/2016 | Matecki | B60R 19/023 |
| 2020/0139492 | A1 * | 5/2020 | Arnold | B23K 33/006 |
| 2021/0033237 | A1 * | 2/2021 | Tsuto | B23K 9/235 |
| 2021/0039326 | A1 * | 2/2021 | DiChiara | B29C 66/91655 |
| 2021/0300276 | A1 * | 9/2021 | Gittere | B60R 21/13 |
| 2022/0126935 | A1 * | 4/2022 | Yoder | B62D 65/024 |

OTHER PUBLICATIONS

International Search Report and Written Opinion for International Patent Application No. PCT/US2023/035192 dated Feb. 22, 2024, 12 pages.

* cited by examiner

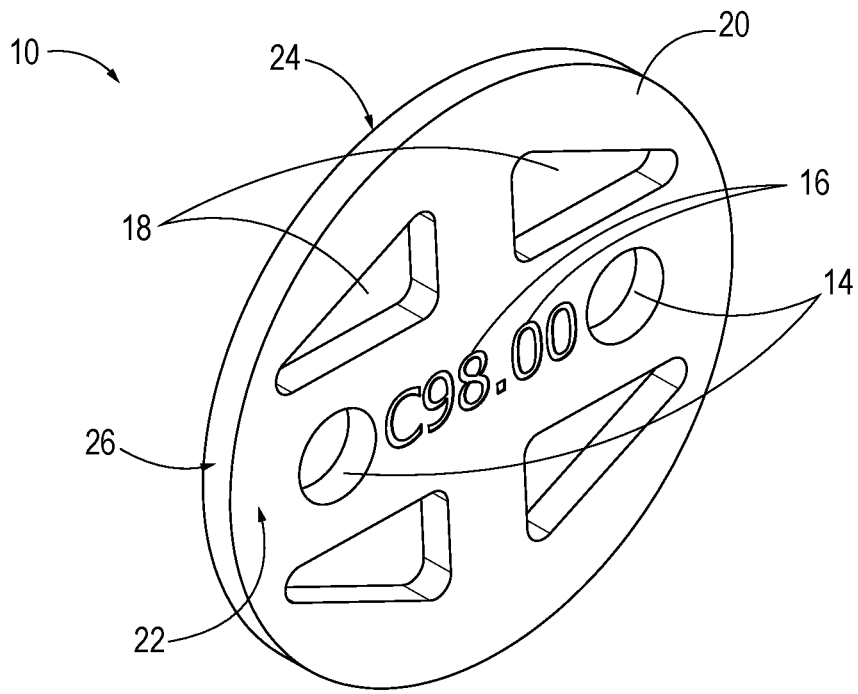
FIG. 4
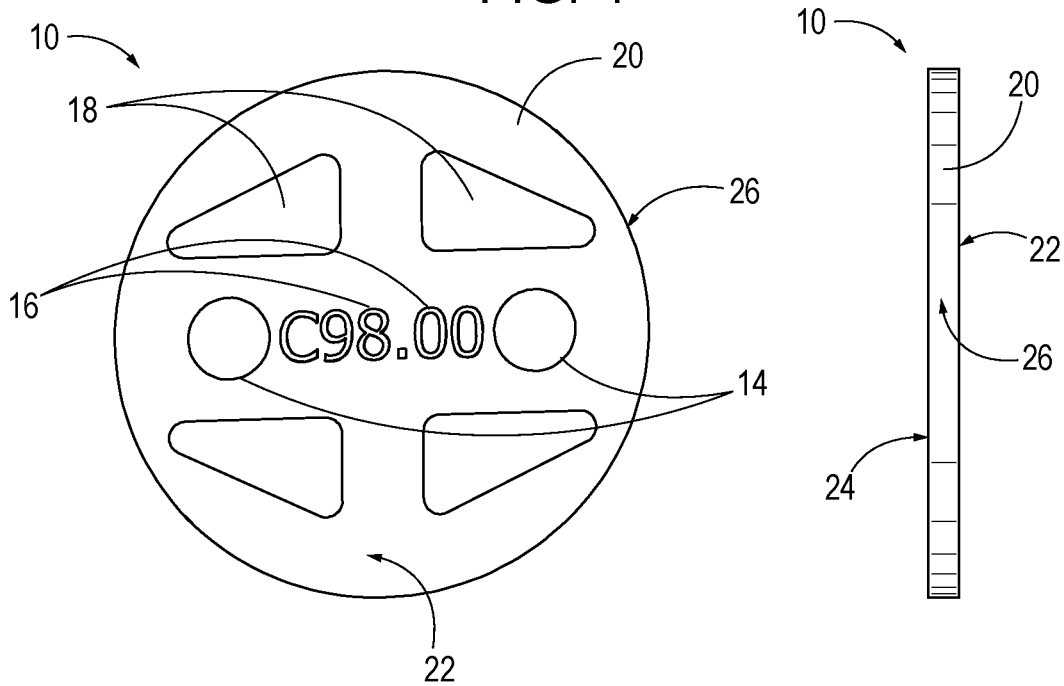
FIG. 5                    FIG. 6

METAL FABRICATION LOCATOR DEVICE AND METHODS

This patent application claims priority to and benefit of U.S. Provisional Application No. 63/416,754, filed Oct. 17, 2022 with the United States Patent and Trademark Office, which is incorporated herein by reference in its entirety.

BACKGROUND

This disclosure relates to metal fabrication and welded connections in metal fabrication. In particular, this disclosure relates to devices for locating and, in some examples, temporarily supporting tube assemblies in metal fabrication for the application of structural welds.

Assembled metal fabricated components made from tube members are often large structures that are cumbersome or difficult to handle and ship. Examples of such assemblies might include vehicle roll cages, vehicle chassis, railing systems, fence systems, support structures, building systems, and architectural assemblies. There has also been increased interest in the do-it-yourself (DIY) market to undertake final assembly and welding of such assemblies by virtue of a kit providing pre-fabricated components. Such kits are advantageous when the assemblies must be built within or upon another structure or at a location different than where the components of the kits are fabricated or manufactured.

One commonality across metal fabricated systems of tube members is that they may be structurally welded. Welding is an activity that requires a great deal of skill, talent, and experience. This is even more important when the welds are relied on for structural components in a metal fabricated system. While there are many tricks to the welding trade, these are often only learned after having gained extensive experience, schooling, or tutelage. Specifically, it is often difficult and time consuming to pre-assemble systems having tight tolerances and welding them through conventional clamping practices. The quality of the welds and the structural integrity of the structural members are of the utmost importance. This is especially important when the welded metal fabrication system is a structural system that health and safety of a user may be dependent upon such as, for example, in vehicle construction (e.g., roll cages) and building construction (e.g., railings). One technique that has been developed to secure and position tube members to receive a weld includes "tab and slot" connections. In a "tab and slot" arrangement, the structural tube members are modified for either having a tab and/or for receiving the tab within a cut out slot of the structural tube member itself. In other words, in a "tab and slot" arrangement, sections of structural tube members are modified by having a recess cut out of one or both members for receiving an independent tab or for the addition of a tab in the corresponding member. These "tab and slot" modifications are then further welded directly to the structural members or in combination with welding the structural members. The "tab and slot" arrangements are added weld fixtures relied on for the positioning of the structural members. As noted above, the recesses/slots or the tabs formed directly into the structural tube members require cutting or other modifications to the structural tube members, thereby, compromising the structural integrity of the structural tube members. This includes removing material and/or having sharp corners or abrupt transitions cut into the structural members (e.g., at the transition where the tab and recesses/slots mate). These sharp corners or abrupt transitions in the structural members become susceptible to stress cracks in the material and in the welds, and also interrupt an, otherwise, continuous weld between the mating structural tube members. Hence, the problems with these assemblies are that the structural integrity of such connections have the potential of being compromised by directly impacting the structural integrity of the structural tube members and/or the structural welds. Further, these assemblies may require modifications to the mating structural tube members and the corresponding welds that may, themselves, compromise the design parameters and intended design strengths.

Additionally, or alternatively, clamps may be used to facilitate holding the mating structural tube members in position to receive a weld. Clamps, however, do not assist with measuring, positioning, or identifying the very location the tube members are to be positioned, as may be required within a particular tolerance. Instead, clamps simply supplement the positioning of said structural tube members by holding them into position only after their position has been identified and confirmed in an assembly by other means. Further, such clamping arrangements impede the accessibility around the mating members for the welding operation. While a tack welding process may be implemented to secure the mating members, so clamps may be removed before a final weld, this creates inefficiencies and only increases fabrication time due to additional handling of the material. Moreover, clamps are, themselves, cumbersome and difficult to manipulate within very complex assemblies.

Structural tube members may be physically held in place by an operator without clamps or assistance until they are tack welded. Physically positioning structural tube members, however, does not provide the requisite precision in many of these structural and aesthetic applications. Specifically, when a member is intended to mate with an adjoining member at complex geometries, requiring a combination of a particular pitch, yaw, or roll for placement, physical placement by an operator simply does not provide the requisite precision without aid. Without adequate precision the fabricated structural tube members simply will not meet design parameters or will require modification in the event components are misaligned, even to the slightest degree—further compromising design parameters.

The ability to maintain very tight tolerances in complex assemblies requires a great deal of ingenuity and expertise that is only becoming harder to find and/or is only acquired at increasing expense. What is needed is a locator device that aids in precisely positioning structural tube members in complex arrangements and geometries within very tight tolerances. What is needed is a locator device that additionally temporarily holds or secures a structural tube member assembly to receive a complete structural weld. What is needed is a locator device that is independent of the mating edges of the structural tube members and is independent of the structural weld. What is needed is a locator device that is not a weld fixture. What is needed is a locator device that becomes fully concealed upon final assembly of the tube structure. What is needed is a locator device that provides identification information for ease in assembly and for identifying the mating members of the structural tubular assembly. What is needed is metal fabrication system with locator devices that are precisely positioned on structural members prior to delivery or shipment to a customer for aiding in the assembly of the metal fabrication system after delivery or shipment. What is needed is a locator device that allows a novice or a DIY metal fabricator to complete projects to the level of a skilled tradesman by aiding the novice or DIY metal fabricator in completing complex arrangements and geometries. What is needed is a system or kit that is easily transportable that facilitates precise assembly at yet another location (e.g., a customer's location), and even in remote locations. What is needed is a locator device that may be constructed from scrap material or otherwise waste sections of material.

SUMMARY

The present disclosure addresses each of the drawbacks identified above by providing, in some examples, a non-structural locator device that facilitates the precise assembly of tubular members in welded metal fabrications. The present disclosure also provides a system or kit that is easily transportable for precise assembly by a customer.

A locator device for a metal fabrication assembly is disclosed herein. The locator device comprises a plate. The plate comprises a front surface, a back surface, and an exterior perimeter. The exterior perimeter corresponds to an interior void of a mating tube for full insertion into the interior void of the mating tube. The exterior perimeter of the plate further biases an interior sidewall of the mating tube. The plate further comprises one or more fasteners inserted into one or more fastening apertures. The fastening apertures extend through the front surface and the back surface of the plate for mechanically securing the back surface of the plate to an exterior sidewall of a receiving tube. In some examples, the exterior perimeter of the plate is less than or equal to an interior perimeter of the interior void of the mating tube of the metal fabrication assembly. In some examples, the exterior perimeter of the plate may comprise one or more interferences. The one or more interferences may be serrations. In some examples, the exterior perimeter of the plate may be incrementally larger than an interior perimeter of the interior void of the mating tube while still allowing for full insertion of the plate into the mating tube but providing an interference of the one or more interferences between the plate and the mating tube to temporarily hold the mating tube to the plate.

In some examples, the plate is a flat plate. In some examples, the plate is a partial tube with the front surface being concave and the back surface being convex. In some examples, the plate is a partial tube inverted on the exterior sidewall of the receiving tube of the metal fabrication assembly when fastened to the receiving tube. In some examples, the plate is a bent angle having a leg extending from the front surface. The leg may comprise a positioning aperture. A fastener may be inserted through the positioning aperture of the leg for securing the plate to the mating tube of the metal fabrication assembly. In some examples, the one or more fasteners are rivets. In some examples, the plate is 14-gauge aluminum. In some examples, the mating tube and the receiving tube may be of the same material or of different material than the plate. In some examples, the mating tube and the receiving tube of the metal fabrication assembly may be low carbon mild steel. The plate may further comprise one or more light weighting apertures and/or light weighting recesses. The plate may further comprise one or more light weighting apertures extending through the front surface and the back surface of the plate. The plate may further comprise one or more light weighting recesses within the exterior perimeter.

The locator device is a non-structural member of the metal fabrication assembly. Specifically, the locator device is a non-structural member of the metal fabrication assembly, and the locator device temporarily positions the mating tube of the metal fabrication assembly relative to the receiving tube of the metal fabrication assembly for application of a weld directly between the mating tube and the receiving tube. In examples, the locator device is not welded. The locator device is not a weld fixture.

In examples, multiple sections of the exterior perimeter of the plate are raised from the exterior sidewall of the receiving tube of the metal fabrication assembly when fastened to the receiving tube. Accordingly, a void is formed between the plate and the receiving tube. Still, the back surface of the plate may be secured directly to the exterior sidewall of the receiving tube of the metal fabrication assembly by one or more fasteners. By example, the receiving tube of the metal fabrication assembly may be round, and the back surface of the plate is fastened to the round receiving tube at a tangent of the round receiving tube and the one or more fasteners extend through the tangent. The plate may be a flat plate wherein multiple sections of the exterior perimeter of the plate are raised from the exterior sidewall of the round receiving tube. The plate may be a partial section of a round or radiused tube and a tangent of the partial section of the round or radiused tube biases the tangent of the receiving tube of the metal fabrication assembly when the plate is fastened to the receiving tube. The partial section of a round or radiused tube may be an unused section of, or cut from, the receiving tube. The partial section of a round or radiused tube may be an unused section of, or cut from, the mating tube.

The plate fastened to the receiving tube is fully inserted into the mating tube of the metal fabrication assembly. The plate is then fully concealed between the receiving tube and the mating tube when the mating tube biases the receiving tube. A weld may permanently secure the receiving tube of the metal fabrication assembly to the mating tube of the metal fabrication assembly. The plate is separated from the weld by the wall thickness of the mating tube. The weld may be a continuous uninterrupted weld about an exterior perimeter of the mating tube.

In examples, the receiving tube of the metal fabrication assembly may be a cylinder, an oval, or an ellipse. In examples, the mating tube of the metal fabrication assembly may be a cylinder, an oval, or an ellipse. The mating tube of the metal fabrication assembly may comprise a coped end, or a coping, that fully mates with the exterior sidewall of the receiving tube of the metal fabrication assembly. In some examples, the mating tube has the same cross-sectional dimension as the receiving tube. In some examples, the mating tube may have a smaller cross-sectional dimension than the receiving tube. In some examples, the wall thickness of the mating tube and the receiving tube are the same. In some examples, the wall thickness of the mating tube and the receiving tube are different. In some examples, the mating tube may intersect the receiving tube at a right angle. In some examples, the mating tube intersects the receiving tube at an oblique angle. In some examples, the edge at the exterior perimeter of the plate may be at an oblique angle relative to the front surface and/or the back surface of the plate for biasing the interior sidewall of the interior void of the mating tube intersecting the receiving tube at an oblique angle.

A metal fabrication assembly may comprise a first locator device. The first locator device may comprise a front surface, a back surface, and an exterior perimeter corresponding to an interior void of a mating tube. One or more fasteners may be inserted into one or more fastening apertures extending through the front surface and the back surface of the first locator device for securing the back surface of the first locator device to an exterior sidewall of a first receiving tube. The first locator device is then fully inserted into the mating tube and the exterior perimeter of the first locator device biases an interior sidewall of the interior void of the mating tube. The first end of the mating tube mates directly with the exterior sidewall of the first receiving tube and fully conceals the first locator device within the mating tube.

In a metal fabrication assembly, the receiving tube and the mating tube are structural members and the first locator device is a non-structural member. The receiving tube is secured to the mating tube by a weld about an exterior perimeter of the mating tube in the metal fabrication assembly. The first locator device is separated from the weld by the wall thickness of the mating tube.

The metal fabrication assembly may further comprise a second locator device. The second locator device may comprise a front surface, a back surface and an exterior perimeter corresponding to an interior perimeter of the mating tube. One or more fasteners may be inserted into the one or more fastening apertures extending through the front surface and the back surface of the second locator device for securing the back surface of the second locator device to an exterior sidewall of the second receiving tube. The second locator device is then fully inserted into the mating tube and the exterior perimeter of the second locator device biases the interior sidewall of the interior void of the mating tube at a second end of the mating tube. The second end of the mating tube is opposite the first end of the mating tube and the second end of the mating tube mates directly with the exterior sidewall of the second receiving tube and fully conceals the second locator device within the mating tube. The metal fabrication assembly may comprise the locator device as described herein.

Examples of the present disclosure also include a structural roll cage for a vehicle. The roll cage may comprise a locator device for a metal fabrication assembly as described herein. The roll cage may comprise a metal fabrication assembly as described herein. The vehicle may be a utility terrain vehicle (UTV).

A system or a kit for a metal fabrication assembly is also disclosed herein. The system or kit may comprise a locator device for a metal fabrication assembly as described herein wherein the metal fabrication assembly is manufactured at a first location and is assembled and welded at a second location. The system or kit may comprise a metal fabrication assembly as described herein wherein the metal fabrication assembly is manufactured at a first location and is assembled and welded at a second location.

A method of manufacturing tubes for assembly in a metal fabrication assembly is also provided. The method may comprise one or more of the following steps: creating a model of a metal fabrication assembly comprising at least one receiving tube and at least one mating tube; identifying one or more connection details for the intersection of the at least one receiving tube and the at least one mating tube in the model, the one or more connection details may comprise one or more of the intersecting angle, the respective tube diameter, and/or the respective tube wall thickness; identifying a shape and a size of a locator device plate based on the one or more connection details in the model; identifying a location of the locator device plate on the at least one receiving tube in the model; straightening the at least one receiving tube and the at least one mating tube in the model, producing an unfolded model comprising the one or more connection details, the shape and size of the locator device plate, and the location of the locator device, when the at least one receiving tube and the at least one mating tube comprise one or more bends; cutting the mating tube by placing a first straight tube in a tube laser cutter and cutting a length of the first tube and a coping in the first tube, when the first tube comprises a coping, based on the unfolded model; bending the mating tube by placing the first tube in the tube bender and bending the first tube, when the first tube comprises a bend, to form the mating tube based on the model; cutting the receiving tube by placing a second straight pipe in a tube laser cutter and cutting a length of the second tube, cutting one or more fastener apertures in the second tube, and cutting a label in the second tube based on the unfolded model; bending the receiving tube by placing the second tube in the tube bender and bending the second tube, when the second tube comprises a bend, to form the receiving tube based on the model; cutting the shape and size of the locator device plate, cutting one or more fastener apertures of the locator device in the locator device plate, and cutting a label of the locator device in the locator device plate based on the model; and pairing the locator device plate to the receiving tube and fastening the locator device plate to the receiving tube using one or more fasteners.

The method of manufacture may further comprise one or more of the following steps: measuring the receiving tube with a laser scanner or a probing measurement system to produce receiving tube measurements; comparing the receiving tube measurements with measurements for the receiving tube in the model; and repeating the step of bending the receiving tube and the steps of measuring and comparing until the measurements of the receiving tube match the measurements for the receiving tube in the model.

The method of manufacture may additionally or alternatively comprise one or more of the following steps: measuring the mating tube with a laser scanner or a probing measurement system to produce mating tube measurements; comparing the mating tube measurements with the measurements for the mating tube in the model; repeating the step of bending the mating tube and the steps of measuring and comparing until the measurements of the mating tube match the measurements for the mating tube in the model.

In some examples of the method for manufacture, the one or more fastener apertures of the locator device pair with the one or more fastener apertures of the receiving plate and the label of the locator device matches the label of the receiving plate.

A method of assembling tubes in a metal fabrication assembly for welding is also provided. The method may comprise one or more of the following steps: positioning a receiving tube to receive a mating tube, the receiving tube comprising a locator device fastened to an exterior sidewall of the receiving tube; forcing the mating tube about the locator device wherein the locator device is inserted into an internal void of the mating tube and biases the interior sidewall(s) of the mating tube; adjusting for the orientation of the mating tube on the locator device based on the shape and size of the locator device and a coping at an end of the mating tube, when the mating tube comprises the coping; abutting the end of the mating tube directly to the receiving tube wherein the end of the mating tube biases the exterior sidewall of the receiving tube and is positioned on the receiving tube by the locator device; and applying a weld directly connecting the end of the mating tube to the sidewall of the receiving tube wherein the locator device is separated from the weld by a wall thickness of the mating tube.

The foregoing and other objects, features, and advantages of the examples will be apparent from the following more detailed descriptions of particular examples as illustrated in the accompanying drawings wherein like reference numbers represent like parts of the examples.

BRIEF DESCRIPTION OF THE DRAWINGS

Reference is made to the accompanying drawings in which particular examples and further benefits of the examples are illustrated as described in more detail in the description below, in which:

FIG. 4 is a top perspective view of a locator device plate, in accordance with an example of the disclosure.

FIG. 5 is a top view of a locator device plate, in accordance with an example of the disclosure.

FIG. 6 is a side view of a locator device plate, in accordance with an example of the disclosure.

DETAILED DESCRIPTION

Figure 1:
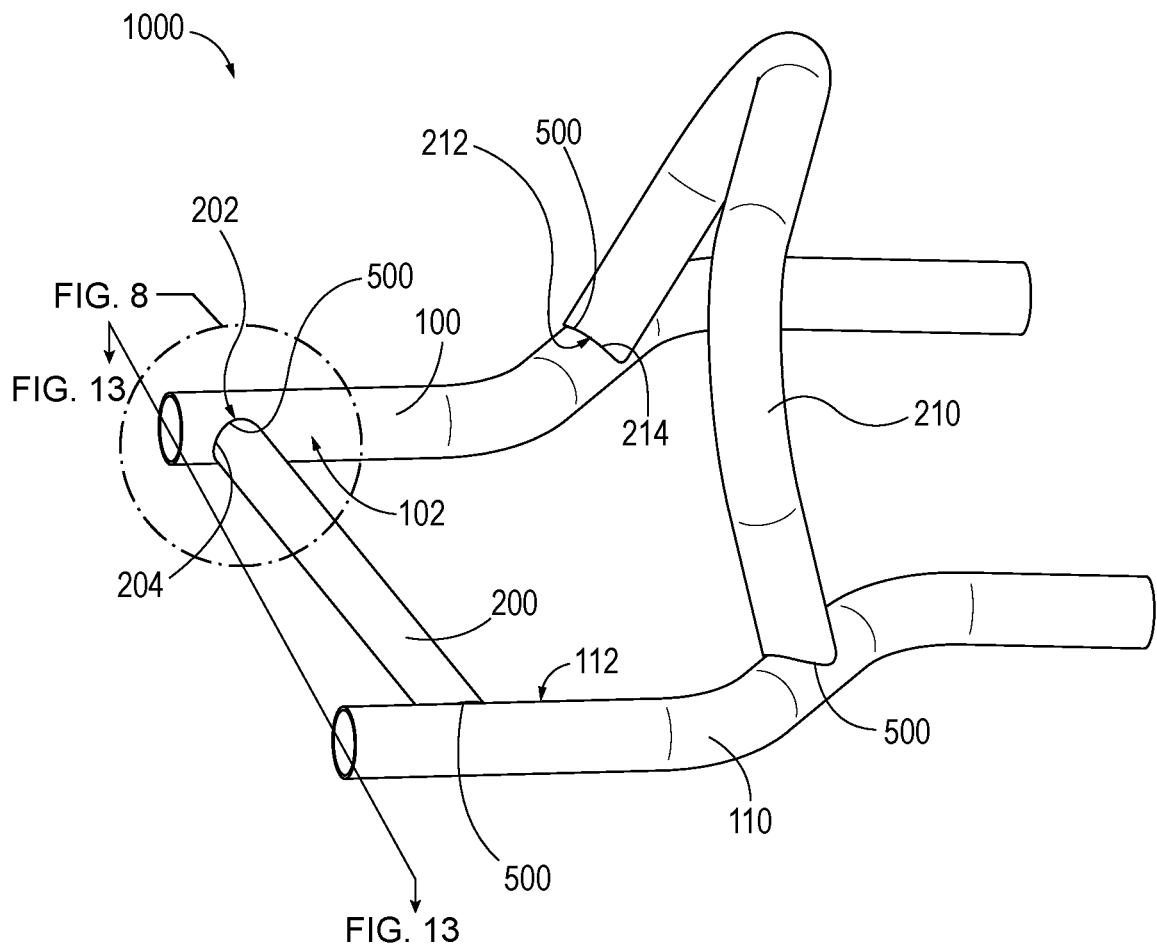
FIG. 1 is a top perspective view of a complex metal fabrication assembly, in accordance with an example of the disclosure.

Welded metal fabrication systems made of structural tube members are used across a variety of applications and industries. Welded metal fabrication systems are relied on for their structural integrity such as, for example, vehicle roll cages. Welded metal fabrication systems are also relied on for their aesthetic appearance such as, for example, architectural assemblies. Some welded metal fabrication systems rely significantly on both their structural integrity and the aesthetic appearance such as, for example, railing systems. Regardless of whether it is for the structural integrity or the aesthetic appearance strict design tolerances must be maintained and solid aesthetically pleasing welds are desired.

Using vehicle roll cages as an example, parts fabricated for roll cages are often designed with complex geometries (see, for example, FIGS. 23-27) that must be assembled within strict tolerances to withstand a predetermined amount of force without failure. It is necessary to have the structural tube members of the system precisely positioned when they are assembled and the welds must be completed with a high degree of quality. However, the increasing size of vehicles utilizing roll cages (e.g., from all-terrain vehicles (ATVs) to utility terrain vehicles (UTVs) and even full-sized off-road vehicles or racecars) has made it increasingly difficult to manufacture and ship fully completed and welded assemblies. Accordingly, metal fabricators have been manufacturing individual components for shipping to third parties unassembled. The third parties must then engage yet another metal fabricator or professional welder to complete the assembly at its final location. The final assembly of the components can be time consuming and difficult using conventional practices. Also, additional unintended fabrication may be undertaken at the time of final assembly to modify and adjust the structural members in the field to accommodate a final assembly that does not otherwise have precise control measures in place. These field modifications may compromise the structural integrity of the system, as designed. Hence, the present disclosure sets forth control measures for the precise positioning of the components of a metal fabrication assembly without compromising the structural integrity of the completed metal fabrication assembly.

The present disclosure identifies a metal fabrication locator device that may be used in a metal fabrication assembly for welding that precisely positions and may additionally hold or secure structural members in their pre-fabricated arrangement for application of structural welds. Once the metal fabrication assembly is welded, the metal fabrication locator devices do not form a part of the structural assembly and/or part of the structural welds. The metal fabrication locator devices of the present disclosure also do not compromise the shape, integrity, or connection between each of the individual structural tube member and/or the structural welds. The metal fabrication locator devices of the present disclosure are ultimately concealed within the metal fabrication assembly. This allows for the precise manufacture of structural tube members with the requisite coping in complex arrangements and geometries for precise assembly. This also allows for the precise manufacture and welding of structural tube members without the need for field modifications at the time of final assembly or welding. The metal fabrication locator device is a plate, or other object as described below, that is fastened to the tangent face of a receiving tube. A mating tube may then slide over the metal fabrication locator device such that the perimeter of the metal fabricator locator device biases the inside sidewall of the mating tube to precisely align it on the receiving tube. This eliminates the use of additional weld fixtures and allows an end user to construct and weld a product together on their own such as, for example, without clamps.

Figure 3:
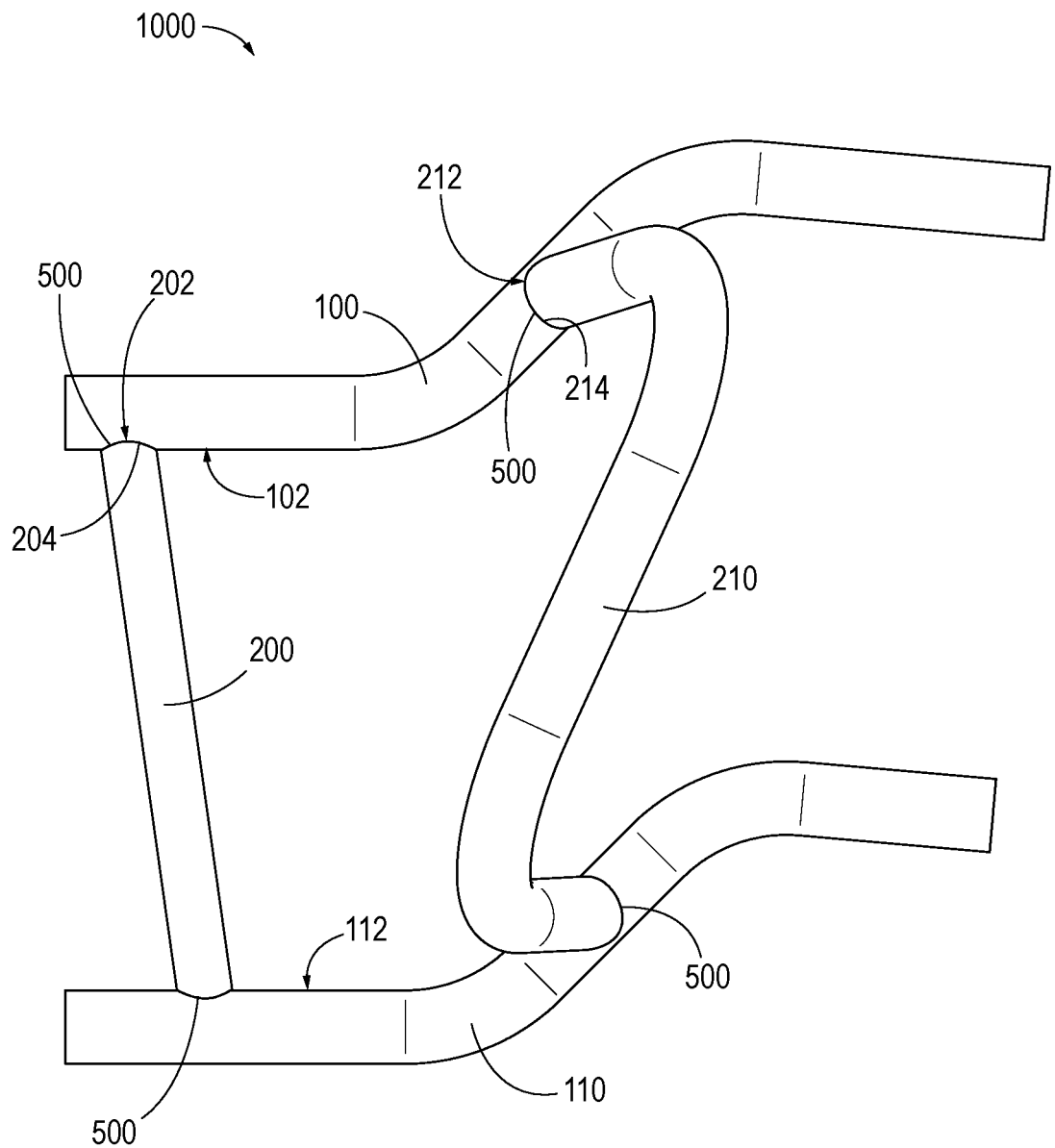
FIG. 3 is a top view of the complex metal fabrication assembly of FIG. 1, in accordance with an example of the disclosure.

FIG. 1 illustrates a top perspective view of a complex metal fabrication assembly 1000 having complex tubular members and geometries. FIG. 3 is a top view of the arrangement of FIG. 1 to simply illustrate the complexity of the assembly 1000, the copings 204, 214 and the geometries between receiving tubes 100 and mating tubes 200, from a different perspective. This particular example of a complex metal fabrication assembly 1000 comprises a first receiving tube 100 and a second receiving tube 110. Also illustrated are a first mating tube 200 and a second mating tube 210. Each tubular member is bent to design parameters for a designated use prior to final assembly. As illustrated by FIGS. 1 and 3, the assembly 1000 itself may be further complicated by incorporating tubular members of different sizes intersecting adjoining tubular members at unique geometries. Additionally, the tubular members themselves may be of a complex geometry with bent members for a particular function such as, for example, those many applications identified above. The ends 202, 212 of the first mating tube 200 and the second mating tube 210 comprise a coping 204, 214, respectively, for engaging a respective exterior sidewall 102, 112 of either the first receiving tube 100 or the second receiving tube 110, respectively, at a precise angle for complete engagement between the adjoining members and for application of a full and uninterrupted structural weld 500 between sidewalls 102, 112 of the abutting and biasing ends 202, 212. In this example, locator devices are fully concealed within the assembly 1000.

It is appreciated herein that the tubular members may be tubular members that are round, oval, ellipse, square, rectangular, triangular, another prism, or the like. It is appreciated herein that tubular members of different shapes and of different sizes may be used in combination with one another in a complex metal fabrication assembly. It is further contemplated herein that, while similar shapes and/or other shapes of similar sizes may be utilized, the materials utilized in a single complex metal fabrication assembly may additionally vary in wall thickness.

Figure 2:
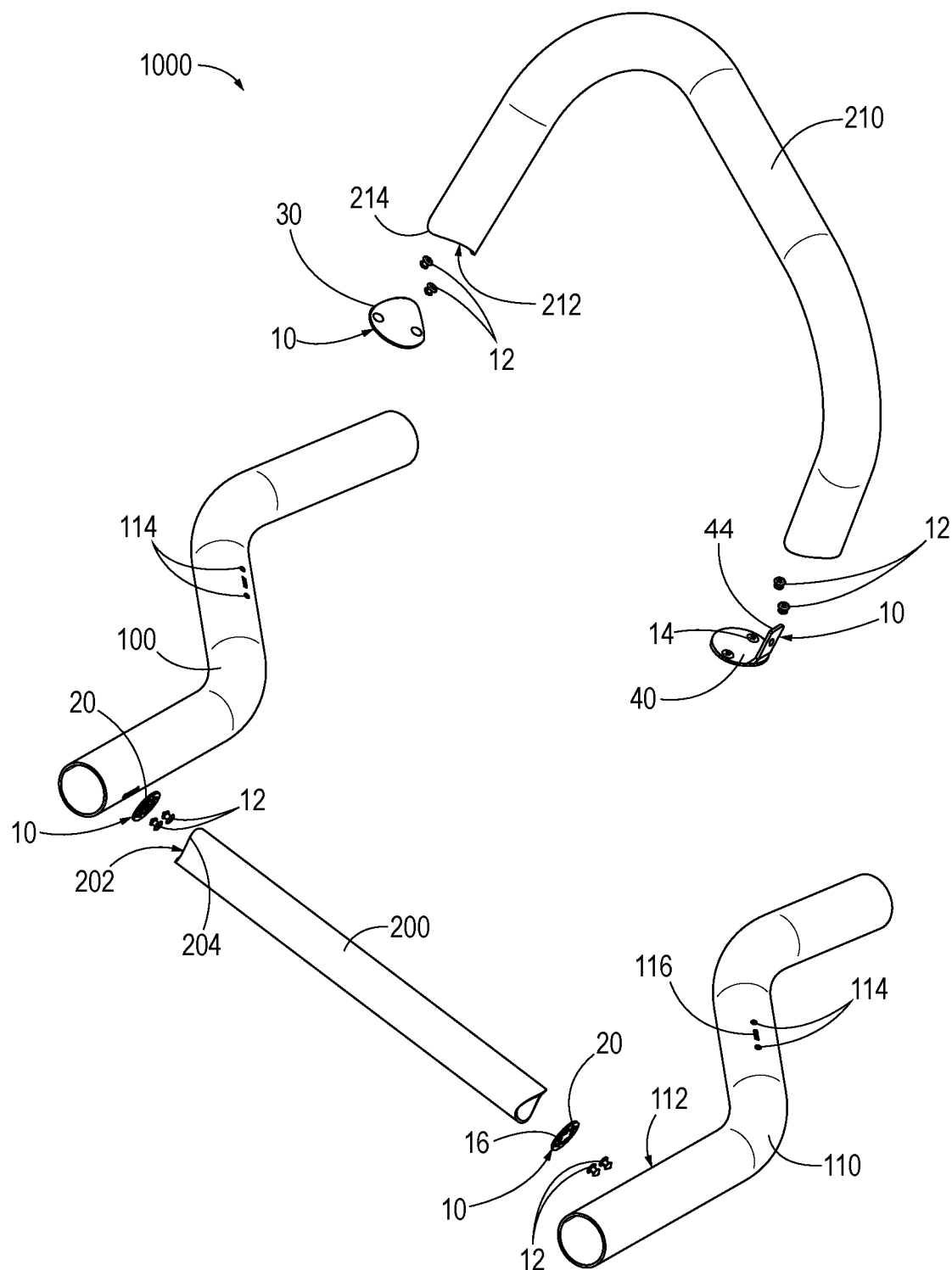
FIG. 2 is an exploded view of the complex metal fabrication assembly of FIG. 1, in accordance with an example of the disclosure.

FIG. 2 illustrates an exploded view of the top perspective view of FIG. 1. The metal fabrication assembly 1000 of FIG. 2 is labeled as described above in view of FIGS. 1 and 3. The otherwise concealed locator devices 10 and locator device fasteners 12 are further illustrated in the exploded view of FIG. 2. Specifically, FIG. 2 illustrates locator devices 10 comprising plates 20 that are flat plates. FIG. 2 also illustrates a locator device 10 comprising a plate 30 that is a curved plate (as further described in view of FIGS. 16-21, below). FIG. 2 also illustrates locator device comprising a plate 40 that is a bent angle having a leg 44 (as further described in view of FIGS. 20-22, below). The fasteners 12 are relied on to mechanically fasten the locator devices 10 to the tangent face of a receiving tube 100. Fastening apertures 114 for receiving the fasteners 12 are precisely located in the receiving tubes 100, 110 in line with fastening apertures 14 in each locator device 10.

Detailed precision may be accomplished by computer aided design (CAD) or modeling (e.g., 3D modeling) that transfers their precise positioning and orientation to a tube laser. Bends within the tubular members may be completed by a computerized numerical control (CNC) bender and may also be further taken into consideration in the CAD or modeling long before the components are fully fabricated. By example, the precise position and orientation of each locator device may be completed in a respective tube by the tube laser before the tubes are bent by the CNC bender. The fastener apertures are provided in their precise location in the final product regardless of the progression of the steps under the CAD or modeling parameters. This degree of precision further allows each mating tube to receive the appropriate coping at each respective ends based on its particular orientation to mate with the receiving tube. This includes providing the appropriate camber at the tube wall thickness on the ends of the mating tubes for properly biasing and contacting the receiving tube to accommodate a full weld between the mating tube and the receiving tube. These specific details will be described in greater detail below in view of method steps for manufacturing.

FIG. 2 also illustrates labels 16, 116 that may also be provided for pairing the appropriate locator device 10 at the appropriate location on the respective receiving tube 100, 110. Specifically, labels 16 may be provided on each plate 20, 30, 40 of the locator devices 10 that further correspond to labels 116 etched into the receiving tube 100, 110. The labels 16, 116 may also be an input in the CAD or modeling parameters and etched into the components by way of a tube laser during this process. This assures the appropriate locator device 10 may be paired at the appropriate receiving tube 100, 110 location in view of the specific parameters of the adjoining mating tube 200, 210 (e.g., mating tube shape, mating tube size, mating tube wall thickness, mating tube intersection angle, mating tube positioning on the receiving tube, camber on the locator device edge, etc.). The locator device 10 may further comprise labels 16, 116 having consistent nomenclature identifying the particular tube diameter and wall thickness it may be paired with in a mating tube 200, 210 and also identify the angle between the receiving tubes 100, 110 and the respective mating tube 200, 210. For example, a label 16, 116 may be "A85.00" where "A" stands for the tube diameter and/or wall thickness and "85.00" stands for the angle between the receiving tubes 100, 110 and the respective mating tubes 200, 210. Further, in one example, no two locator devices may have the same fastener aperture arrangement in a single metal fabrication assembly 1000. In other words, every locator device within a single metal fabrication assembly 1000 comprises a different fastener aperture arrangement. This provides added security to keep an operator from inserting or providing the wrong locator device 10 in the wrong location.

As illustrated by the comparison between FIG. 1 and FIG. 2, the fastener apertures 114 and the labels 116 etched into the receiving tube 100, 110 of FIG. 2 are fully concealed within the respective mating tube 200, 210 and do not compromise the structural integrity of the mating tubes 200, 210, the weld 500 between the mating tubes 200, 210, and the structure of the receiving tubes 100, 110 outside of the weld 500 on the receiving tubes 100, 110 and the respective mating tube 200, 210. This is further aesthetically favorable by concealing the present control parameters utilized for assembly only, as imparted by the locator devices 10. The locator device 10 is not positioned directly between the tube members 100, 110, 200, 210 and, therefore, does not separate the biasing arrangement directly between the tube members 100, 110, 200, 210. The locator device 10 does not become a part of the final weld 500 or final connection between the tube members 100, 110, 200, 210. The locator device 10 is non-structural, such that it is a non-structural aid that is limited to positioning and/or temporarily securing or holding the tube members 100, 110, 200, 210 of the metal fabrication assembly 1000 together for final assembly and for receiving a final weld 500.

As noted above, fasteners 12 are relied on to mechanically fasten the plates 20, 30, 40 of the locator devices 10 to the receiving tubes 100, 110 by way of pairing the fastener apertures 14 of the locator device 10 with the fastener apertures 114 of the receiving tubes 100, 110. Any mechanical fastener may be used. It is appreciated herein that the fasteners 12 need not be structural fasteners, or fasteners required to support the structural integrity of the metal fabrication assembly 1000 in use. Hence, the locator device 10 need not be welded to the tube members 100, 110, 200, 210 and, in particular examples, the locator devices 10 are not welded to the tube members 100, 110, 200, 210 or any feature of the metal fabrication assembly 1000. However, it is contemplated herein that the locator device 10 may be welded to one or more components (e.g., tack welded) based on customer parameters or customer requested criteria in some examples. In one particular example, the fasteners 12 are rivets. Rivets operate particularly well in this arrangement because the inside of the receiving tubes 100, 110 are typically inaccessible. Accordingly, rivets provide a means to fasten the plates 20, 30, 40 of the locator device 10 to the receiving tubes 100, 110 from the exterior without having to gain access to the inside of the receiving tubes 100, 110.

Turning now to FIG. 4. FIG. 4 is a top perspective view of a plate of a locator device 10. In this example, the plate 20 is a flat plate. The flat plate 20 comprises fastener apertures 14. The flat plate 20 further comprises light weighting apertures 18. Light weighting apertures 18 may be provided to reduce the weight of the overall assembly such as, for example, for race cars, aviation structures, or other weight restrictive structures. The light weighting apertures 18 are simply an example of removing material of the locator device 10 in an effort to reduce the material weight of the locator device 10. The light weighing components need not be limited to light weighting apertures 18. Light weighting recesses may additionally, or alternatively, be provided at the exterior perimeter 26 of the plate 20. The flat plate 20 of FIG. 4 further comprises a label 16 additionally etched into the plate 20 of the locator device 10 as described above. As noted above, each of the fastener apertures 14, the light weighting apertures 18, and/or the label 16 may be laser cut into and/or through the plate 20 from a front surface 22 to a back surface 24 of the plate 20. Light weighting may additionally be accomplished by providing a lighter gauge material or simply providing a lighter material composition such as, for example, aluminum. In one particular example, a locator device plate 20 may be 14 Ga 6061 aluminum. A variety of materials for the locator device plate are contemplated herein and include, for example, metal, aluminum, plastic, wood, composite, brass, bronze, paper, titanium, tin, a combination thereof, or the like, and etc. In the case of some of the examples, the same or different material may be utilized for the fabrication assembly. FIG. 5 is a top view of a plate 20 having the features described above in FIG. 4. FIG. 6 is a side view of a plate 20 having the features described above in FIG. 4.

Figure 7:
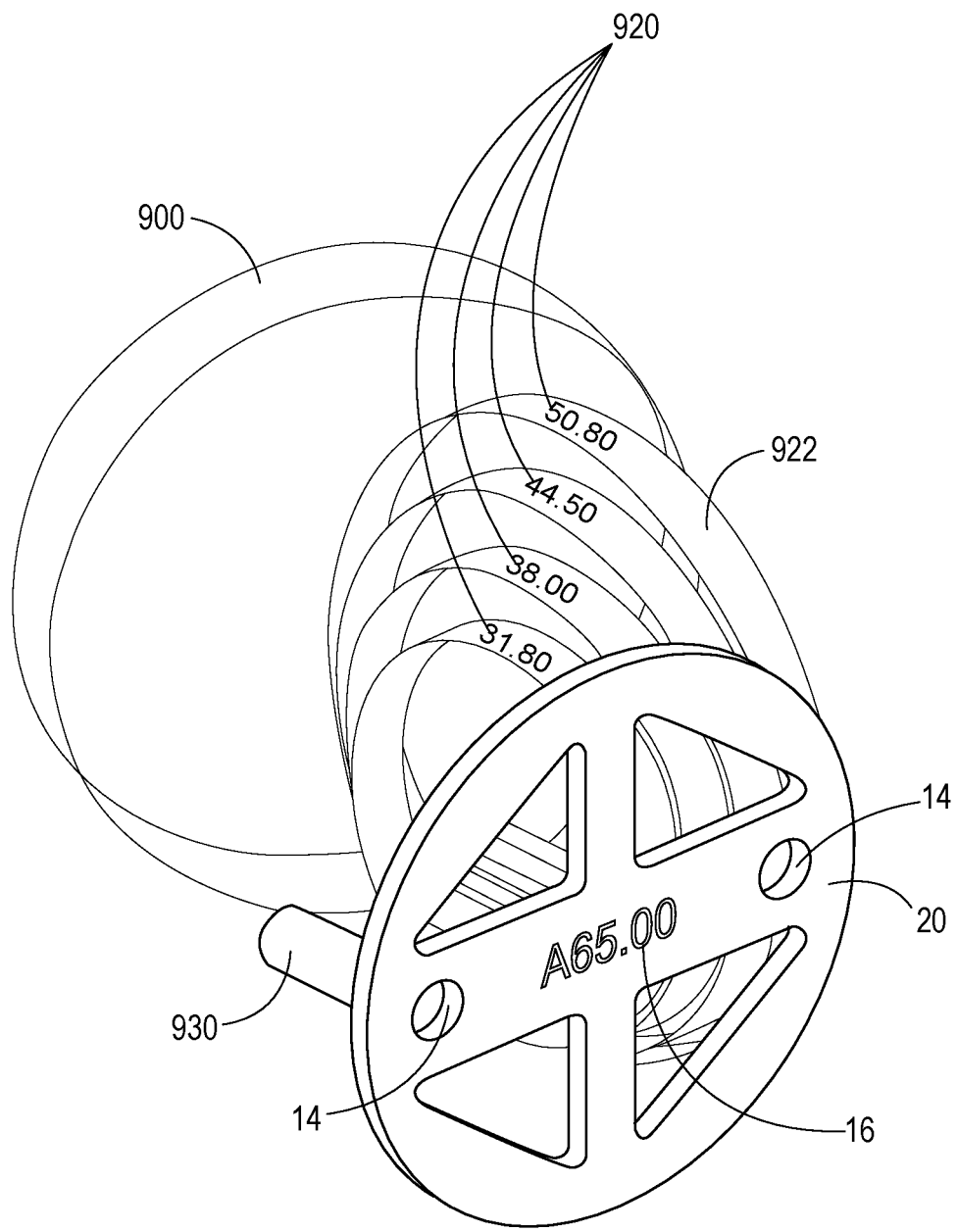
FIG. 7 is a top perspective view of a locator device with accompanying design aids, in accordance with an example of the disclosure.

FIG. 7 illustrates a plate 20 for a locator device accompanied by design aid parameters utilized in a model. The design aid parameters assist with identifying and selecting the particular details for the plate 20 within the model before fabrication of the plate and/or fabrication of the receiving tube to which the plate is fastened. The modeling design aids comprise a mating tube design aid 900, receiving tube design aids 920, and a fastening aperture design aid 930. To select the appropriate plate 20 and features for the appropriate plate 20 the plate is first paired with a mating tube design aid 900 in the model. The mating tube design aid 900 reflects the angle of the mating tube relative to an axis of the receiving tube. The mating tube design aid 900 also reflects the diameter of the mating tube and/or the wall thickness of the mating tube. With this information, a baseline plate 20 is identified in the model that then may be further modified for the receiving tube design aids 920. The receiving tube design aids 920 may reflect, for example, the available receiving tube diameters, available to accommodate the selected mating tube and angle. Of these available receiving tube diameters a selected receiving tube design aid 922 is selected. Through this process the receiving tube design aids 920 are reflected relative to the angle identified above in view of the mating tube design aid 900. Once these features are identified in the model the model may further allow a user to select the desired fastening aperture design aids 930, or modify them accordingly for proper pairing in a metal fabrication assembly. The model with the selected mating tube design aid 900, the selected receiving tube design aid 922, and the fastening aperture design aid 930 is overlayed within the model on the modeled tubes in an arrangement where the placement of the design aids may be reflected directly upon the receiving tube in the model to give instructions to laser cut the fastener apertures and the labeling on the receiving tube. Similarly, the design aids further identify the appropriate features for selection of or the laser cutting of the appropriate plate 20 with the fastener apertures 14 and the labels 16 of the plate 20. These design aids further assist with facilitating the method of manufacturing steps further described below.

Figure 8:
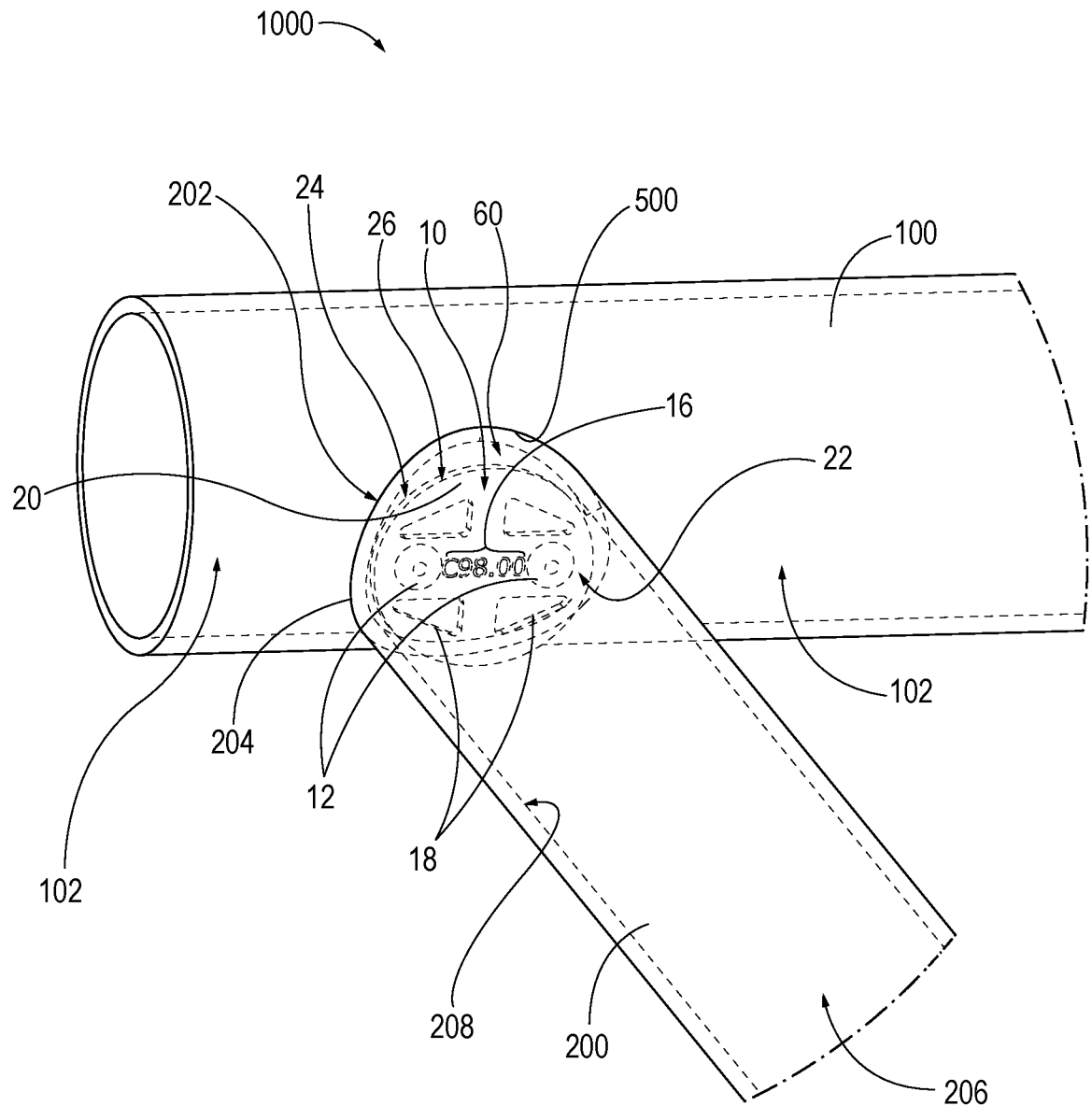
FIG. 8 is a partial view of a connection of a complex metal fabrication assembly taken at FIG. 8 of FIG. 1, in accordance with an example of the disclosure.

Turning now to FIG. 8. FIG. 8 is a partial view of a connection of the complex metal fabrication assembly 1000 of FIG. 1. Features otherwise concealed are illustrated with dashed lines. In FIG. 8, a mating tube 200 mates directly with a receiving tube 100. The end of the mating tube 200 comprises a coping 204 for biasing directly with the exterior sidewall 102 of the receiving tube 100 in the desired orientation and angle between the receiving tube 100 and the mating tube 200. The end 202 of the mating tube 200 is in direct contact with the receiving tube 100 without any intervening components. Within the inside void 206 of the mating tube 200 is a locator device 10. The locator device 10 is a flat plate 20 having fastener apertures 14 and light weighting apertures 18. The flat plate 20 also comprises a label 16 etched therein. The fastener apertures 14 of the flat plate 20 correspond to fastener apertures 114 (as shown in FIG. 2) of the receiving tube 100. A back surface 24 of the flat plate 20 is secured directly to the tangent face of the exterior sidewall 102 of the of the receiving tube 100 by fasteners 12. The front surface 22 faces outwardly in a direction of the mating tube 200 and is inserted into the void 206 of the mating tube 200. The fastener apertures 14, 114 (as shown in FIG. 2) are aligned directly on the intersecting point of the tangent of the round exterior sidewall 102 of the receiving tube 100 that receives the flat plate 20. Because the plate 20 is a flat plate and the exterior sidewall 102 of the receiving tube 100 is round the exterior perimeter 26 of the flat plate 20 that is not in full contact with the receiving tube 100 and is raised from the exterior sidewall 102 of the receiving tube 100 at two sides. Accordingly, the sections of the exterior perimeter 26 of the flat plate 20 that are raised from the exterior sidewall 102 of the receiving tube 100 are more deeply positioned within the interior perimeter/void 206 of the mating tube 200 and bias the interior sidewalls 208 of the mating tube 200 within the tube a distance separated from that very end 202 of the mating tube 200. In other words, there is a gap 60 between a portion of the locator device 10 and the exterior sidewall 102 of the receiving tube 100 and, accordingly, there is a gap 60 between the locator device 10 and the very end 202 of the mating tube 200 because the locator device 10 is inserted inwardly on the interior sidewall 208 of the mating tube 200. This not only helps to position the mating tube 200 into the proper position and orientation relative the receiving tube 100 but helps to firmly secure the mating tube 200 to the receiving tube 100 until a permanent weld 500 is applied. As further described below the locator device 10 may further comprise features that further assist with holding or maintaining the mating tube 200 in position on the receiving tube 100. As additionally illustrated by FIG. 8, once the mating tube 200 is positioned on the receiving tube 100 the plate 20 of the locator device 10 is fully concealed within the mating tube 200.

Figure 9:
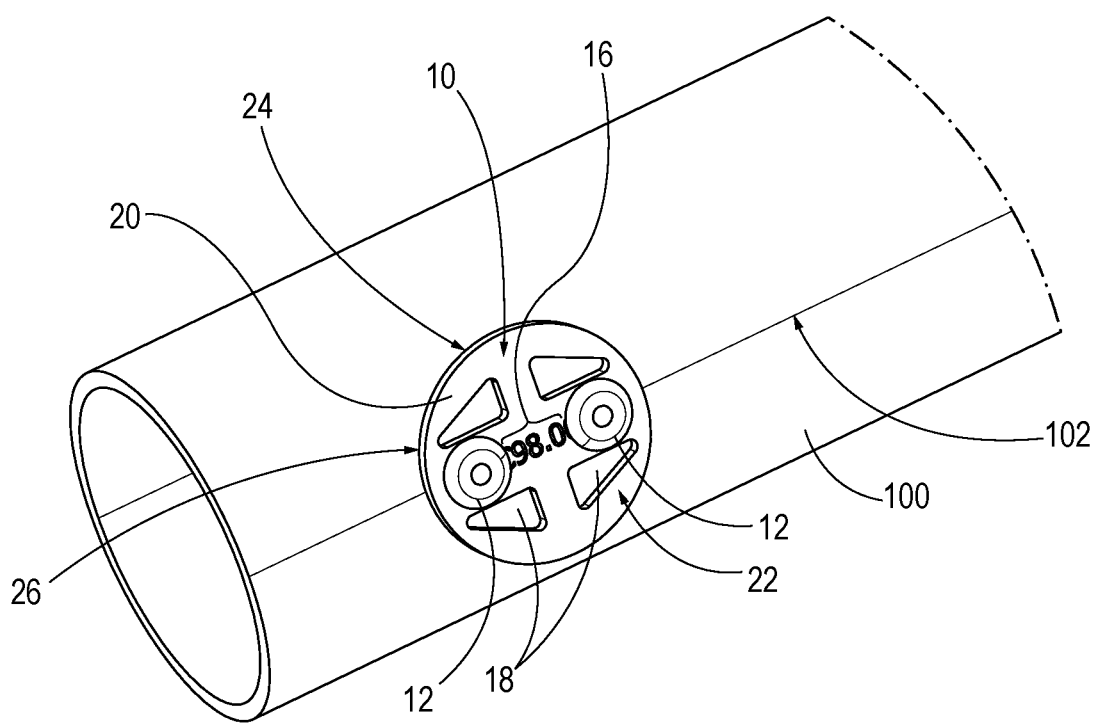
FIG. 9 is a partial view of a receiving tube with a locator device, in accordance with an example of the disclosure.
Figure 10:
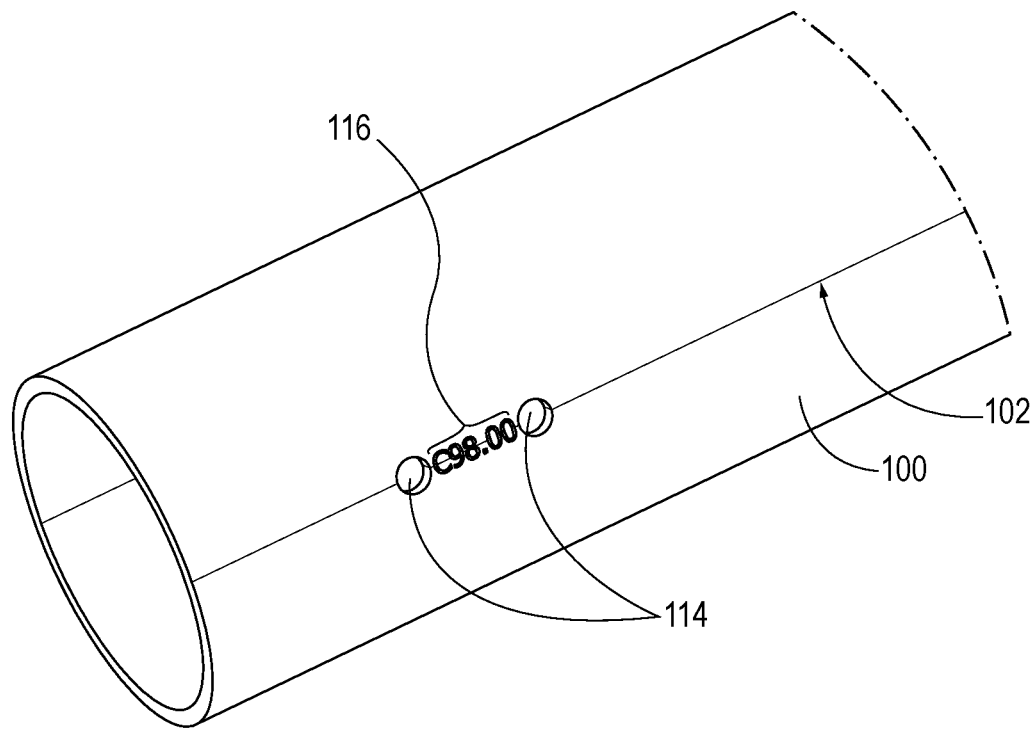
FIG. 10 is a partial view of a receiving tube for receiving a locator device, in accordance with an example of the disclosure.
Figure 11:
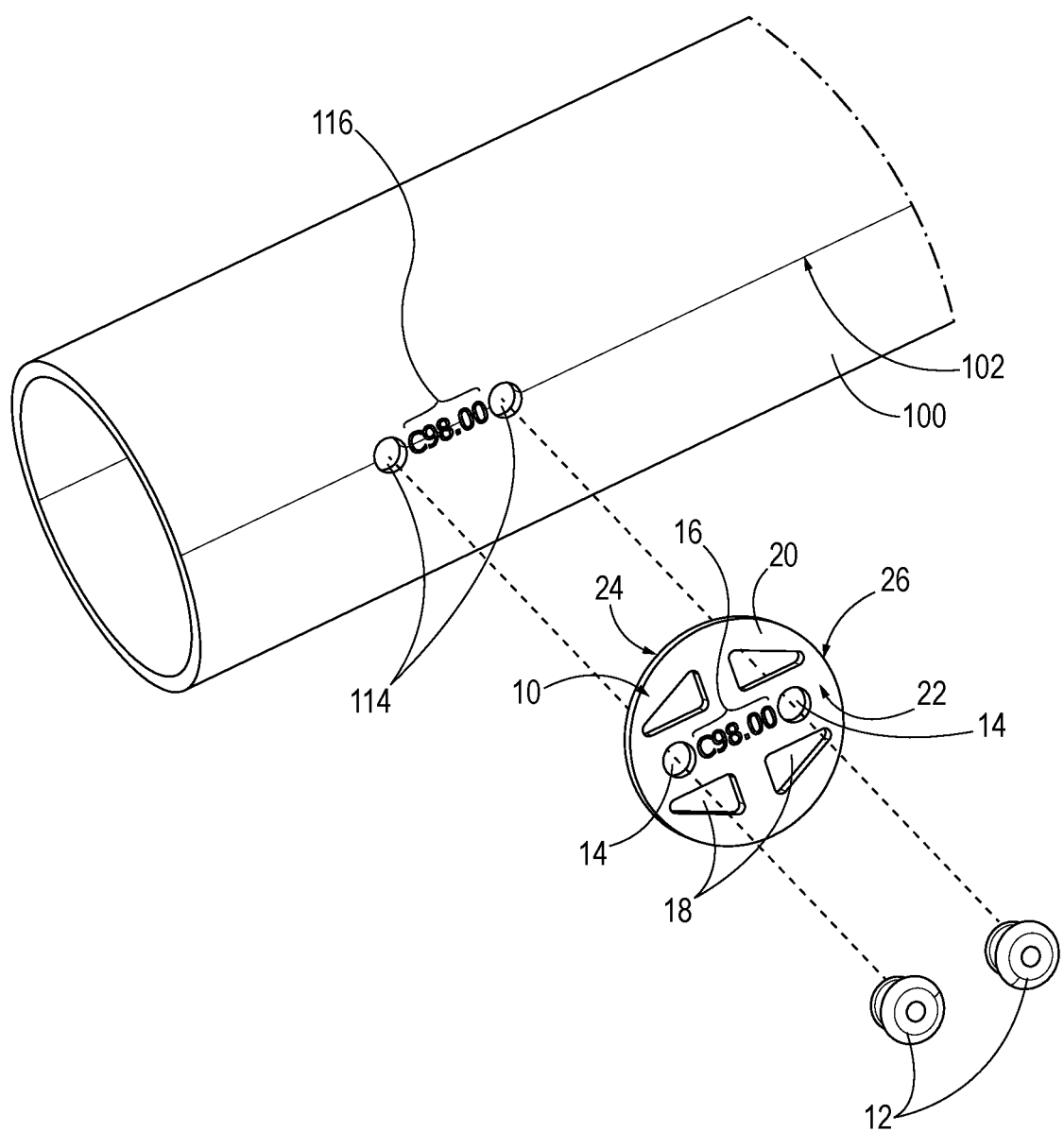
FIG. 11 is an exploded view of the partial view of FIG. 9, in accordance with an example of the disclosure.

Turning now to FIG. 9, the receiving tube 100 with the locator device 10 is illustrated with the mating tube 200 of FIG. 8 removed for clarity and illustrative purposes. The features of the receiving tube 100 and the locator devices 10 are labeled as described with respect to the same in FIG. 8. Turning now to FIG. 10, the receiving tube 100 is illustrated with the locator device 10 and the mating tube 200 of FIG. 8 removed for clarity and illustrative purposes. In FIG. 10, the fastener apertures 114 of the receiving tube 100 are illustrated. Between the fastener apertures 114 are a label 116 cut into the receiving tube 100 for identifying the appropriate locator device 10 to be applied. It is noted that the identifier of the label 116 matches the identifier of the label 16 of the locator device 10 of FIG. 9 not only by nomenclature but by positioning and orientation. This further assists with properly positioning the locator device 10 on the receiving tube 100 and fastening the locator device 10 to the receiving tube 100 to properly mate with the mating tube 200 in the appropriate orientation and angle, as designed. Finally, FIG. 11 illustrates an exploded view of the locator device 10 being fastened to the receiving tube 100 of FIG. 9 by fasteners 12 extending through the fastener apertures 14 of the locator device 10 and the fastener apertures 114 of the receiving tube 100. The label 116 of the receiving tube 100 matches the label 16 of the locator device 10 as noted above. Progression of manufacture and subsequent assembly may advance in the order illustrated by FIG. 10 to FIG. 11 to FIG. 9, and ultimately adding the mating tube 200 of FIG. 8 where a weld 500 may be applied directly between the mating tube 200 and the receiving tube 100 without interference by the locator device 10. In other words, a separate weld fixture (e.g., welded "tab and slot") is not added to either the receiving tube nor the mating tube and is not utilized to locate, position, or hold the mating tube 200 to the receiving tube 100.

Figure 12:
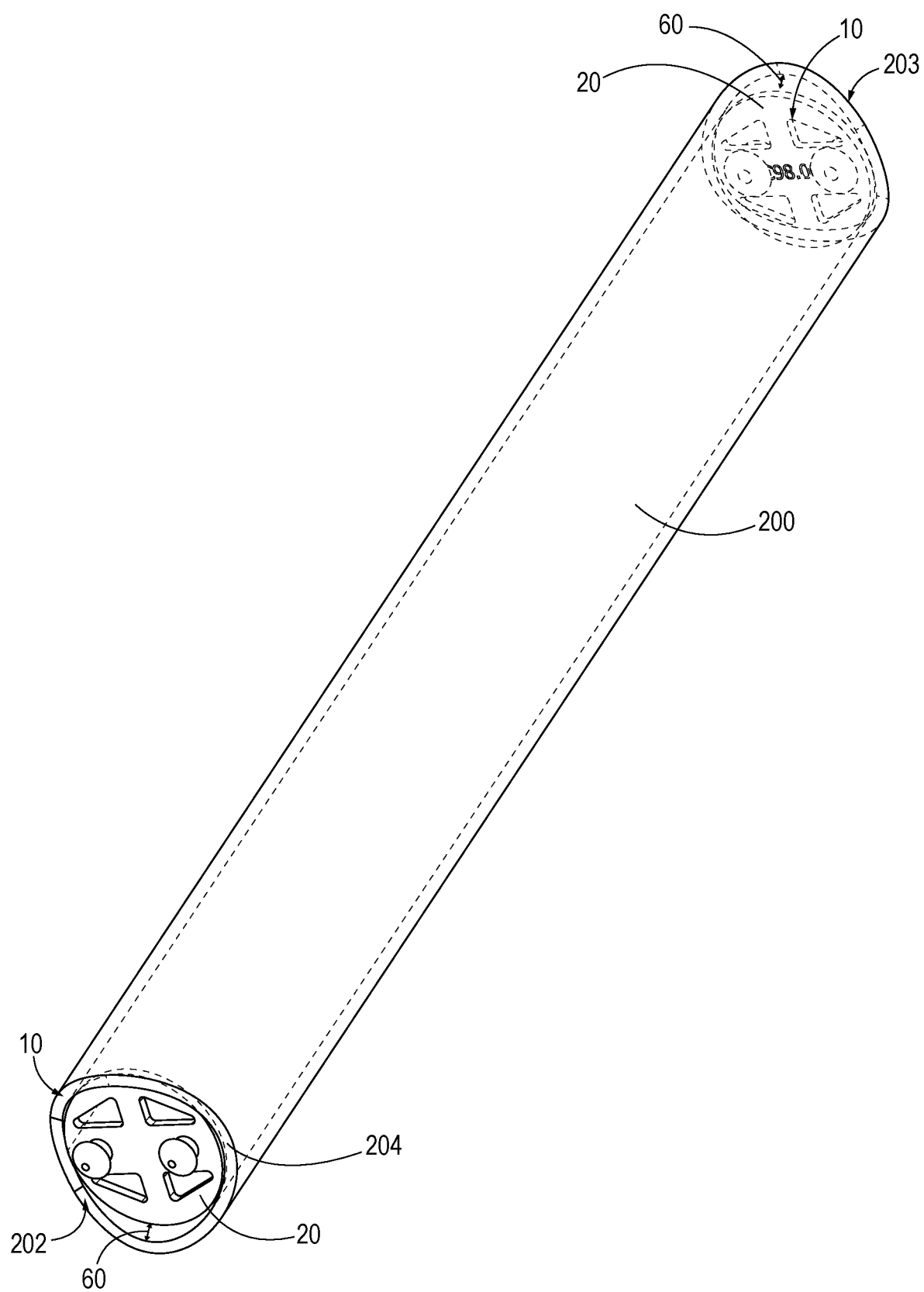
FIG. 12 is a perspective view of a mating tube with locator devices positioned therein and absent the receiving tubes, in accordance with an example of the disclosure.

In FIG. 12, a mating tube 200, with the plate 20 of the locator devices 10 fully positioned therein at opposing ends 202, 203, is illustrated. Respective receiving tubes 100, 110 at each end, to which the respective locator devices 10 would be fastened, are removed for clarity and illustrative purposes. FIG. 12 illustrates the recessed nature of the plate 20 within the mating tube 200 once the mating tube 200 mates with a receiving tube. Specifically, a gap 60 is formed between the end of the mating tube 200 in view of the coping 204. Further, because receiving tubes would otherwise be positioned at opposing ends 202, 203 of the mating tube 200 and the locator devices 10 are fastened directly to the receiving tubes the mating tube 200 would be immobilized into its precise position once the receiving tubes are in position. The plates 20 of the locator devices 10, which are fully positioned within the inside of the mating tube 200, preventing the mating tube 200 from moving out of its desired final position. Further, the coping 204 at the respective ends 202, 203 of the mating tube 200 further support and provide a surface at the respective ends 202, 203 of the mating tube 200 to mate directly with and bias the exterior sidewall of the receiving tube for receiving a final weld to permanently secure the mating tube 200 to each receiving tube.

Figure 13:
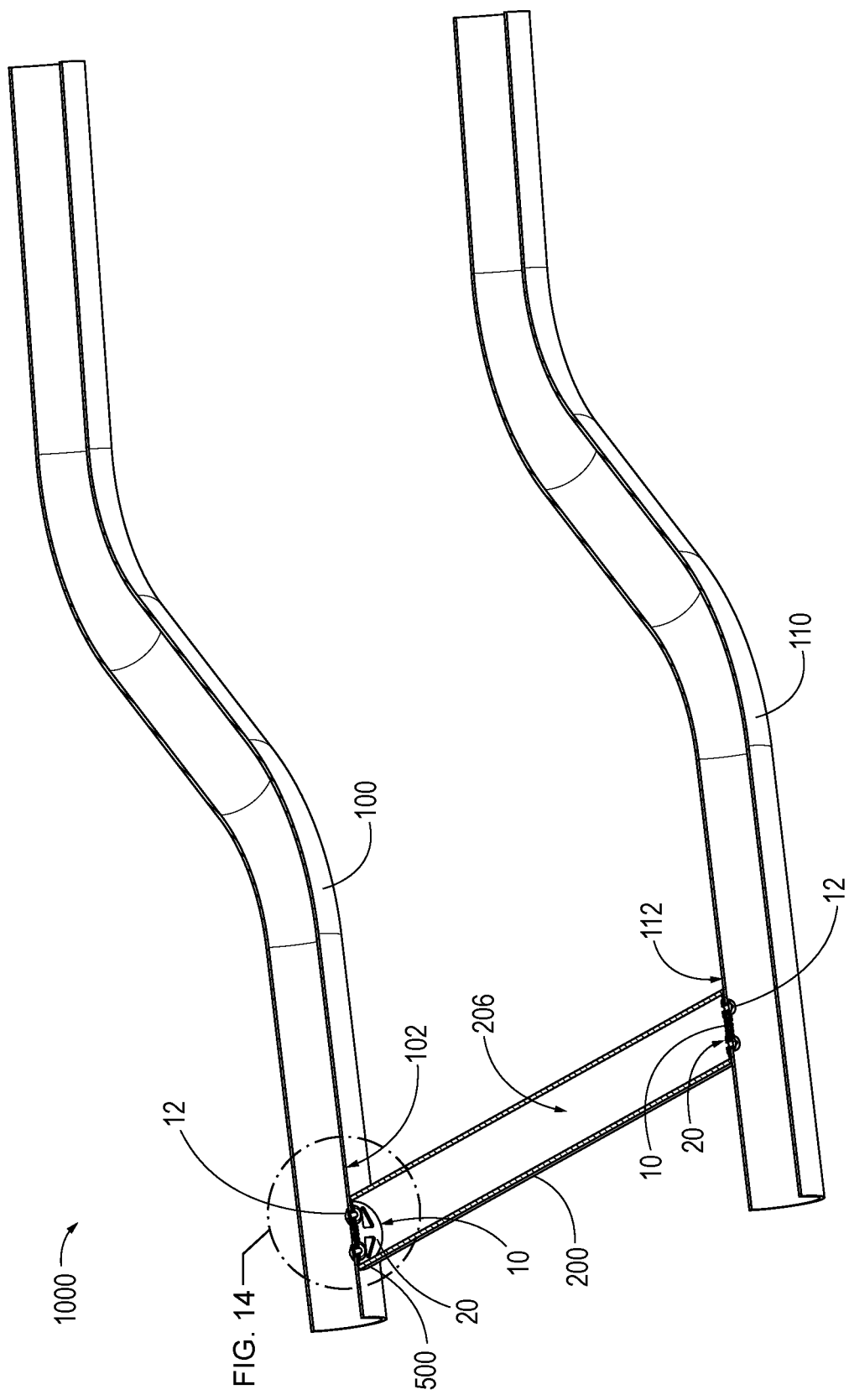
FIG. 13 is a cross-sectional view of a connection of a complex metal fabrication assembly taken at line FIG. 13-FIG. 13 of FIG. 1, in accordance with an example of the disclosure.
Figure 14:
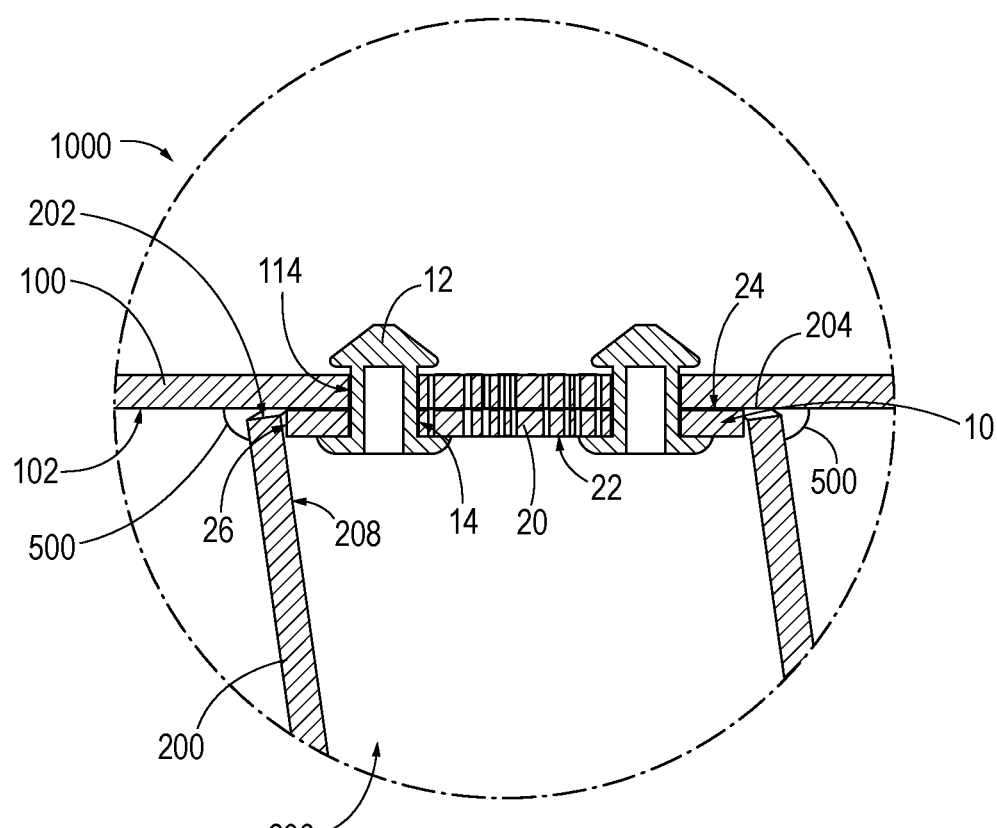
FIG. 14 is a cross-sectional partial top view of a connection of a complex metal fabrication assembly taken at FIG. 14 of FIG. 13, in accordance with an example of the disclosure.

The cross-sectional views of FIGS. 13-14 further illustrate those features described above. In FIG. 13, a cross sectional view of a metal fabrication assembly 1000 of FIG. 1 is illustrated. This illustration only reinforces how the locator device 10 is fully concealed within the void 206 of the mating tube 200 and by the respective receiving tubes 100, 110. This also only further enforces how the locator device 10 does not form a part of or intersect the final connection between the mating tube 200 and the respective receiving tubes 100, 110, or the weld 500 between the mating tube 200 and the respective receiving tubes 100, 110. The locator device 10 truly is independent of and provides no weakening impact to the structural integrity of the completed metal fabrication assembly 1000, where the weld 500 about the exterior perimeter of the mating tube 200 and between the mating tube 200 and respective receiving tubes 100, 110 fully conceal the fastener apertures 114 in the receiving tubes 100, 110, the fastener apertures 14 in the plate 20 of the locator device 10, and the fasteners 12 themselves. Once welded, the locator device 10 no longer provides any support or function to the metal fabrication assembly 1000 and, therefore, does not present any compromising characteristics or intervening features to the completed metal fabrication assembly 1000.

FIG. 14 is a partial view of FIG. 13 taken at the tangent of the receiving tube 100 onto which the plate 20 of the locator device 10 engages and is fully supported by the exterior sidewall 102 of the receiving tube 100. The fastener apertures 114 of the receiving tube 100 and the fastener apertures 14 of the locator device 10 are additionally positioned on the tangent of the receiving tube 100 such that the fasteners 12 support the locator device 10 on the tangent of the sidewall 102 of the receiving tube 100. The mating tube 200 slides directly over top of the plate 20 of the locator device 10, with the very end 202 of the mating tube 200 bearing directly on the exterior sidewall 102 receiving tube 100. The locator device 10 fastened to the receiving tube 100 prevents the mating tube 200 moving laterally because the exterior perimeter 26 of the plate 20 of the locator device 10 biases directly on the interior sidewall 208 of the interior void 206 of the mating tube 200. The respective coping 204 of the mating tube 200 further assists to position the mating tube 200 on the receiving tube 100 at the appropriate orientation and angle in combination with being positioned by the locator device 10 for precise positioning. A weld 500 may then be subsequently applied directly between the mating tube 200 and the receiving tube 100, independent of the locator device 10, to permanently secure the mating tube 200 to the receiving tube 100.

Figure 15:
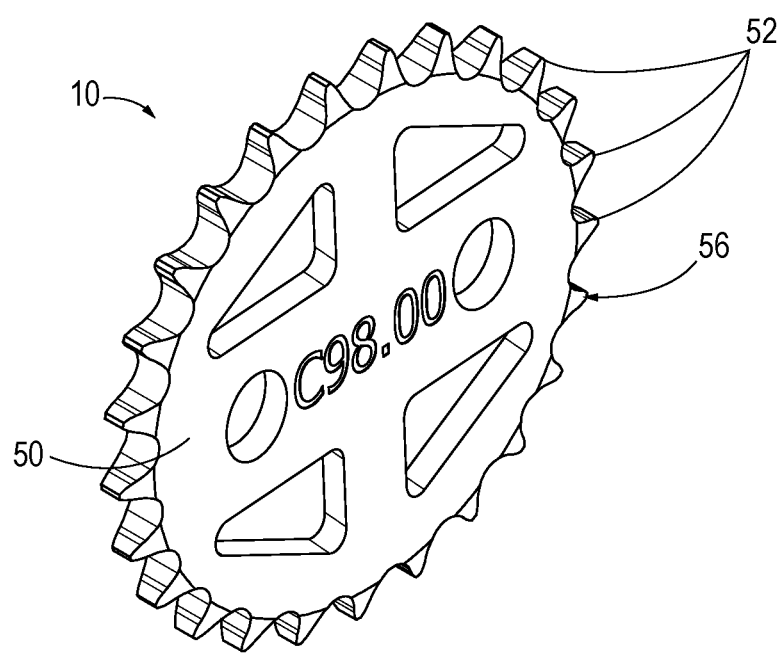
FIG. 15 is a top perspective view of a locator device plate, in accordance with an example of the disclosure.

FIG. 15 illustrates another example of a locator device 10 with plate 50. The plate 50 of FIG. 15 is a flat plate with serrations 52 provided thereon. The serrations 52 of the plate 50 are illustrative of how the locator device 10 may comprise interferences. An interference may be an incremental increase in the size of the plate 50 such that the mating tube must be forced overtop creating a friction fit between plate 50 and the mating tube. Once forced onto the plate 50 the exterior perimeter 56 of the plate 50 conforms to the interior sidewalls of the mating tube drawing the mating tube into the receiving tube and holding or securing the mating tube to the plate temporarily until a weld may be applied directly between a mating tube and a receiving tube. Interferences may be provided in situations where the mating tube may not be able to be secured directly between a pair of opposing receiving tubes but must still be held in place independent of outside support. The interferences are not intended, nor should they be relied on, as a final structural connection between a mating tube and a receiving tube. The interferences are simply provided to provide a much tighter connection between the mating tube and the receiving tube before a final weld may be applied. While the entire perimeter of the plate may be incrementally increased to provide an interference, the example of FIG. 15 illustrates serrations 52 about the exterior perimeter 56 of the locator device plate 50 such that the serrations 52 incrementally increase the exterior perimeter 56 of the plate 50 to be slightly larger than the interior perimeter of the mating tube it is to be paired to. Yet, the serrations 52 are not so large that the interior perimeter of the mating tube is incapable of being forced about the exterior perimeter 56 of the plate 50. Instead, the interior perimeter of the mating tube is still capable of being forced overtop of the locator plate 50 such that the locator plate 50 is fully inserted into the mating tube as described and illustrated above. Interferences may take any form capturing the function defined above. Further, interferences may be applied to any locator device plate and is not limited to a flat plate example.

Figure 16:
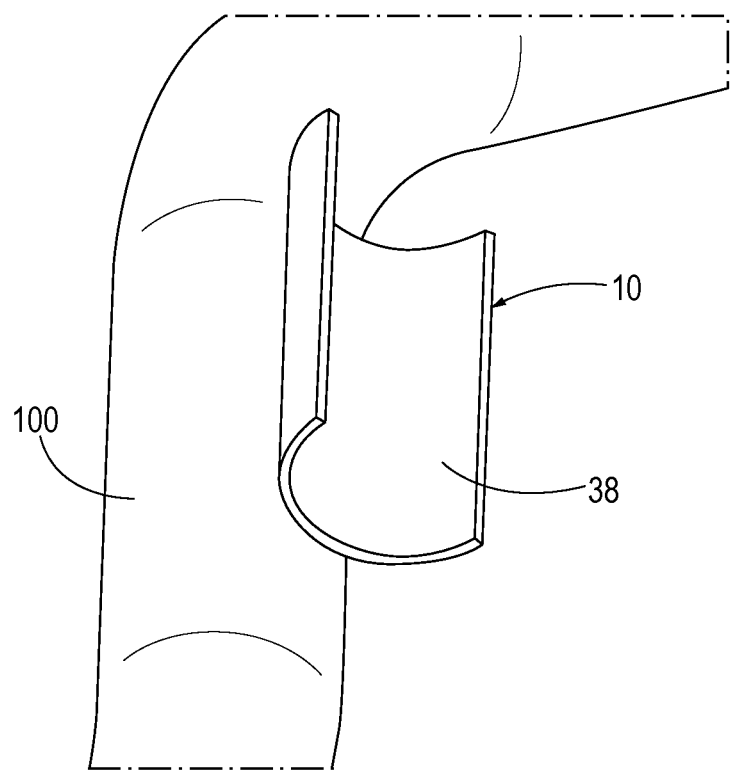
FIG. 16 is a top perspective view of the manufacture of a locator device plate on a receiving tube, in accordance with an example of the disclosure.
Figure 17:
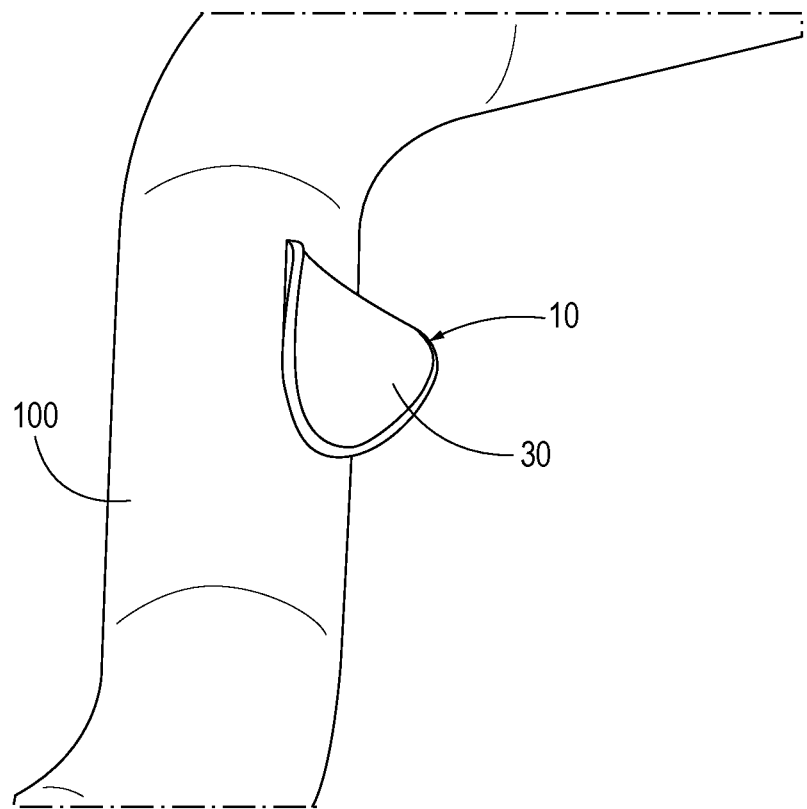
FIG. 17 is a top perspective view of the manufacture of a locator device plate on a receiving tube, in accordance with an example of the disclosure.
Figure 18:
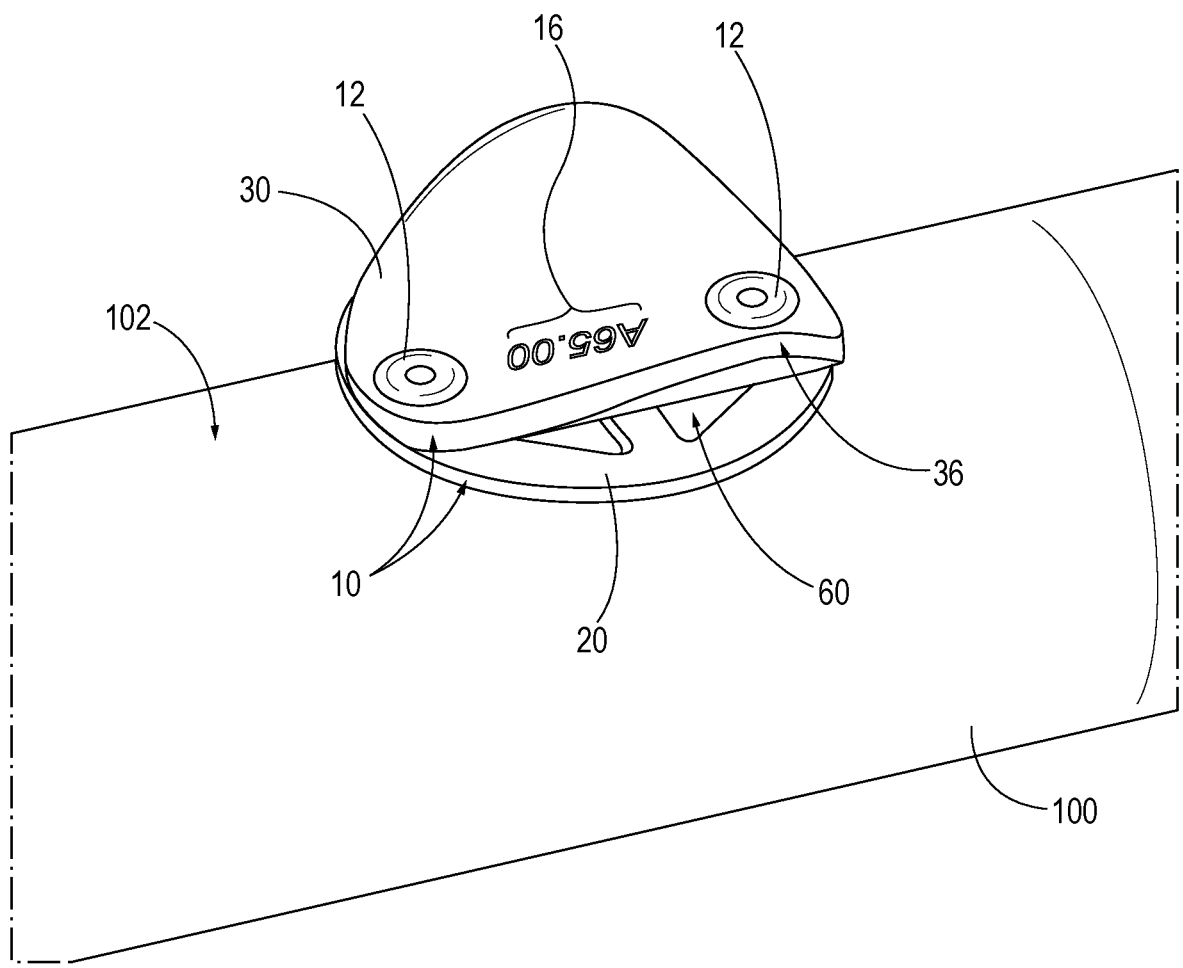
FIG. 18 is a top perspective view of a locator device on a receiving tube, in accordance with an example of the disclosure.
Figure 19:
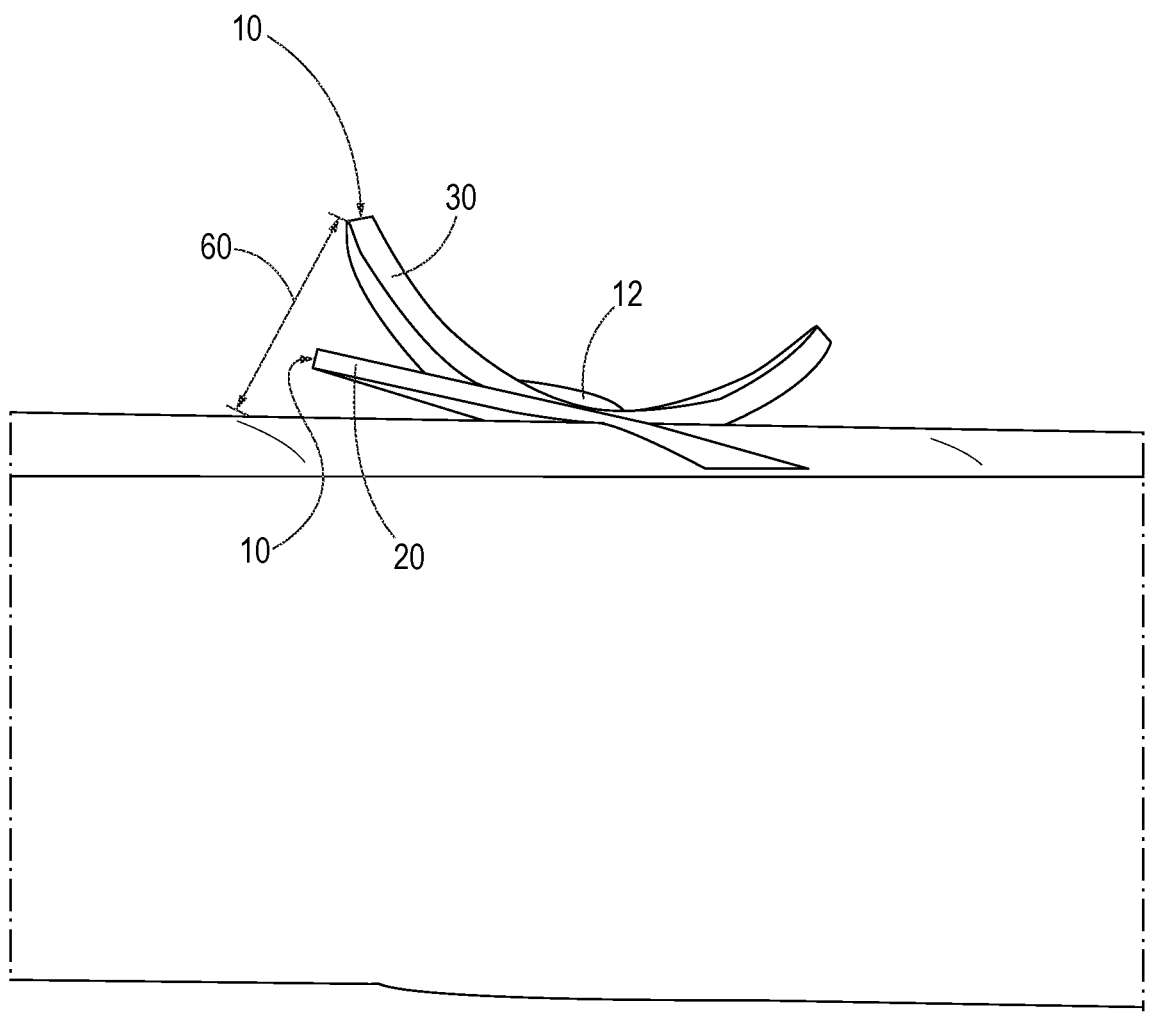
FIG. 19 is a side view of a locator device on a receiving tube, in accordance with an example of the disclosure.

Another example of a plate 30 for a locator device 10 is illustrated by FIGS. 16-19. In particular, FIGS. 16-17 illustrates the manufacture of this particular example of a locator device plate 30 and FIGS. 18-19 illustrate this particular example of a locator device plate 30 overlayed on a flat plate 20 to illustrate the improvements thereto. The locator device plate 30 of FIGS. 16-19 is formed from a section of tubular member 38. Accordingly, the locator device plate 30 may be formed from discarded scrap materials otherwise utilized for the metal fabrication assembly. FIG. 16 illustrates a half section of a tubular member 38 before the plate 30 for a locator device is formed therefrom. The half section of the tubular member 38 of FIG. 16 is positioned on a receiving tube 100 for illustrative purposes in the fashion the plate 30 of the locator device 10 that is formed therefrom will be positioned on a receiving tube 100, such as in FIGS. 18-19. FIG. 17 further illustrates how the shape of the plate 30 for a locator device 10 may be cut from the half section of the tubular member 38 of FIG. 16. A tube laser may be utilized for this exercise, thereby, generating the requisite size of the locator device plate 30 based on the interior dimensions, positioning, and angle of a mating tube to be received on the receiving tube 100. Turning now to FIG. 18, the plate 30 formed from a half section of a tubular member 38 is overlayed overtop of a flat plate 20, both positioned and secured to the receiving tube 100. The partial tubular plate 30 is overlayed overtop of the flat plate 20 for illustrative purposes. Yet, it may be further contemplated herein that a combination of plates, regardless of whether they are the same or they are different, may be utilized at a single connection. As illustrated by FIG. 18, because the partial tubular plate 30 possesses an exterior perimeter 36 that curves away from the receiving tube 100 it will be inserted a greater distance into the mating tube and the gap 60 between the end of the mating tube and the exterior surface of the receiving tube is greater. This provides greater bite onto or greater bearing surface within the interior sidewalls of the mating tube. Additionally, or alternatively, this further illustrates a plate 30 that may be used in combination with square, rectangular, or other prism receiving tube where the receiving tube may not, itself, create the requisite separation from the perimeter of the locator device plate 30 when the plate 30 is secured to the exterior sidewall 102 of the receiving tube 100. Because the plate 30 may be inserted into the mating tube member a greater distance, the mating tube is more strongly maintained in its precise position in view of a flat plate 20 which is inserted into the mating tube a shorter distance with less bite or bearing on the interior sidewall of the mating tube. Like the flat plate 20, the partial tubular plate 30 comprises fastener apertures and fasteners 12 as well as a label 16 for its particular application. FIG. 19 only further exemplifies this. FIG. 19 further illustrates a side view of the partial tubular plate 30 overlayed overtop of a flat plate 20 to illustrate the increased distance, or gap 60, the partial tubular plate 30 would otherwise be inserted into the mating tube.

Figure 20:
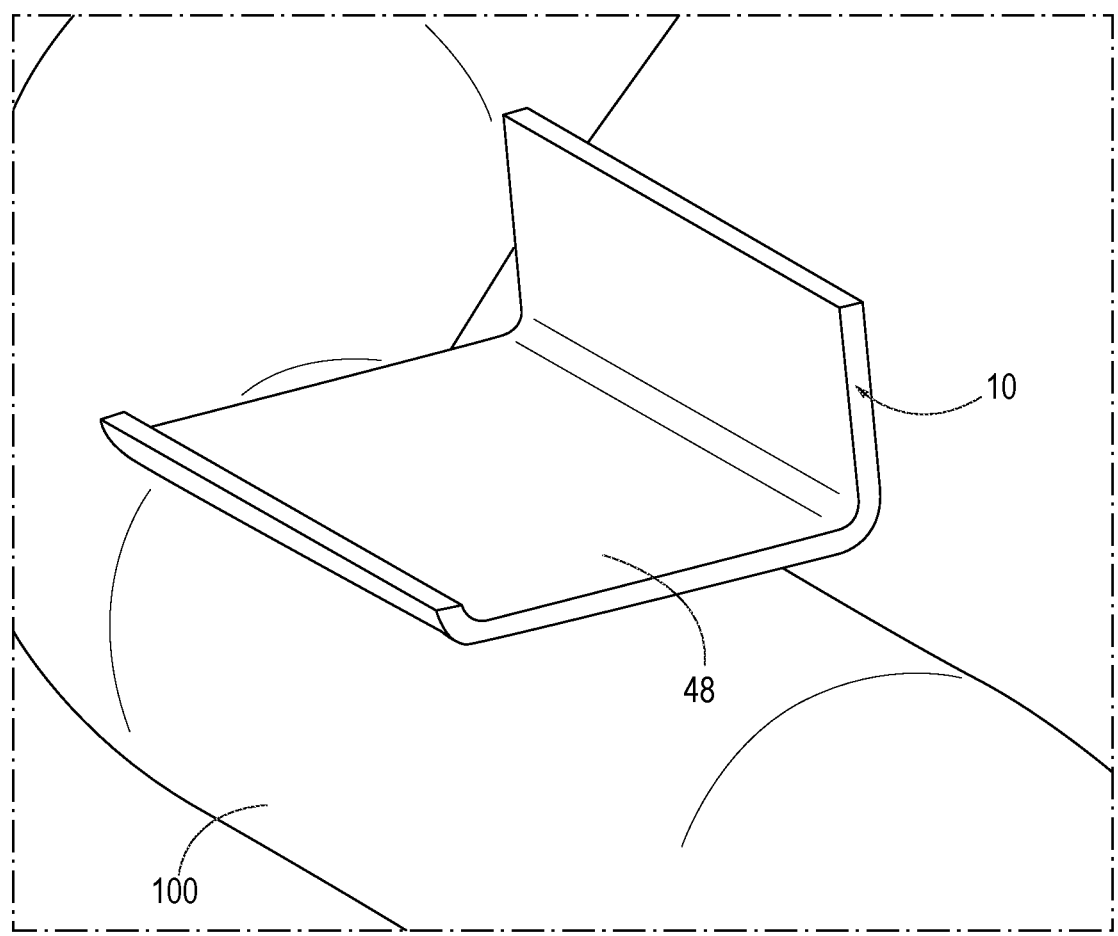
FIG. 20 is a top perspective view of the manufacture of a locator device plate on a receiving tube, in accordance with an example of the disclosure.
Figure 21:
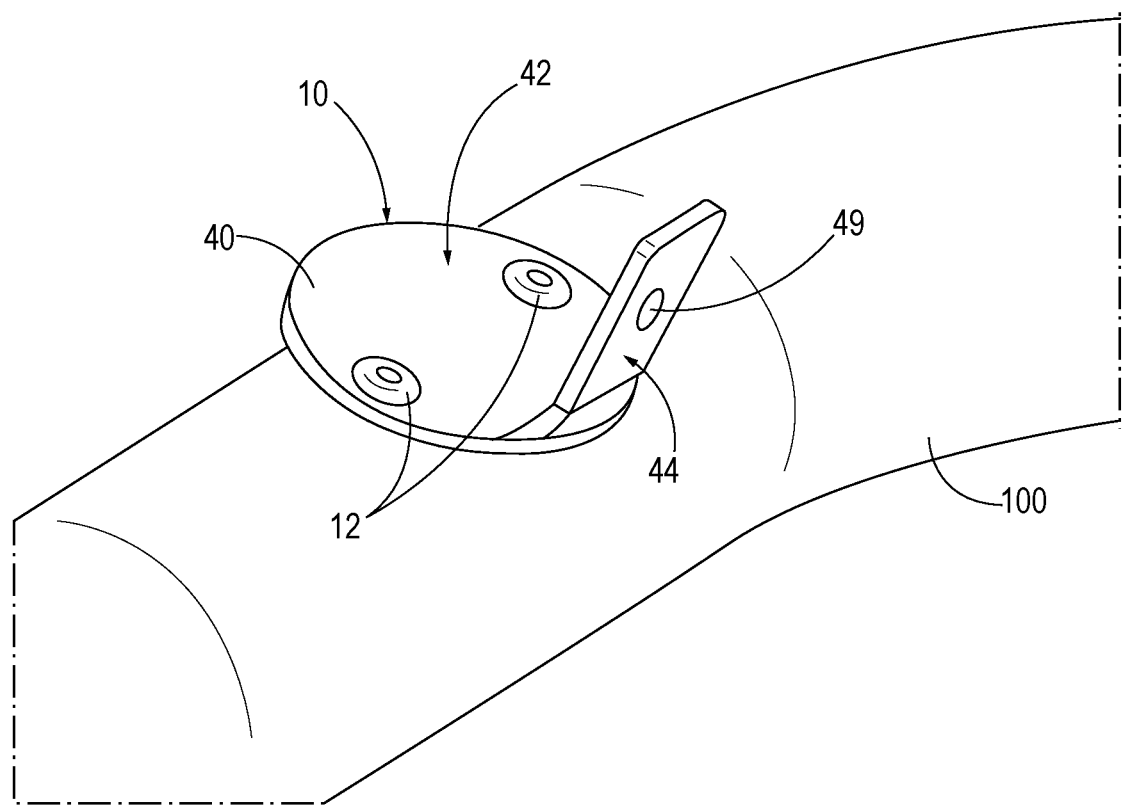
FIG. 21 is a top perspective view of a locator device on a receiving tube, in accordance with an example of the disclosure.
Figure 22:
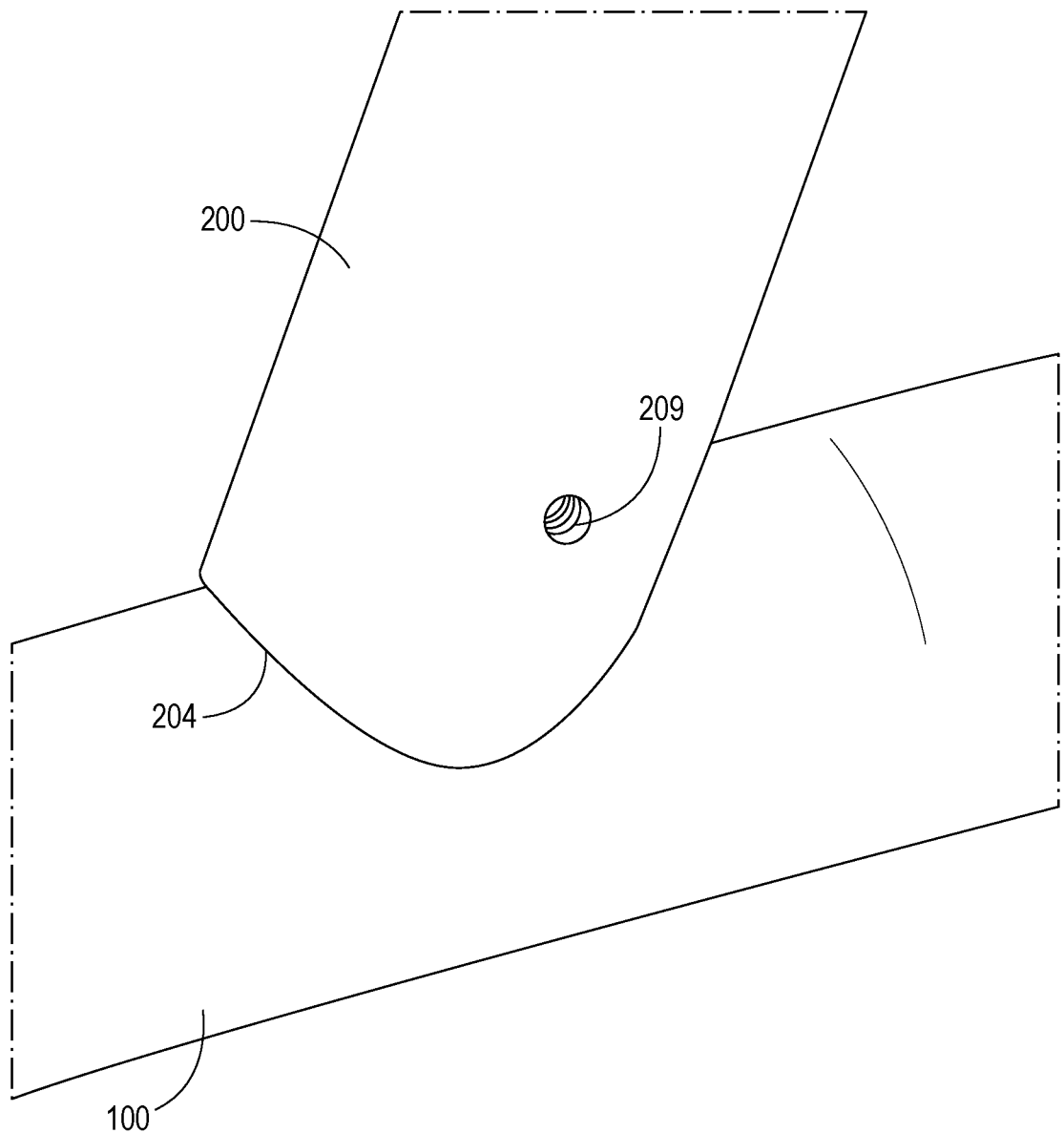
FIG. 22 is a top perspective view of a connection of a complex metal fabrication assembly, in accordance with an example of the disclosure.

Yet another example of a plate 40 for a locator device 10 is illustrated by FIGS. 20-22. FIG. 20 illustrates the manufacture of this particular example. FIG. 20 illustrates a partial section of a rectangular tubular member 48 that may be shaped into a plate 40 for a locator device 10. The material relied on for this example may also be an angle or a partial section of a channel. Again, the plate 40 may be formed from discarded scrap or otherwise unused material. The partial section of a rectangular tubular member 48 is illustrated positioned on a receiving tube 100 just as the formed plate 40 for a locator device 10 would be. In FIG. 21, a plate 40 formed from the material of FIG. 20 is illustrated. This particular plate 40 comprises a flat section 42 with a leg 44 extending from the flat section 42 away from the receiving tube 100. In this arrangement, it is a bent angle with the flat section 42 having a shape similar to the shape of a flat plate for a locator device as described in examples above. The leg 44 extending from the flat section 42 provides additional support and additional depth into the mating tube. The leg 44 may additionally be modified to be bent at an angle corresponding to the angle the mating tube is received onto the receiving tube 100. Again, the bent angle plate is fastened to the receiving tube by fasteners 12 in the same manner as described above.

As further illustrated by FIG. 21, the leg 44 of the bent angle plate 40 locator device 10 may further comprise a positioning aperture 49. The positioning aperture 49 may be provided to correspond to a precisely positioned positioning aperture 209 in the mating tube 200, as illustrated by FIG. 22. The positioning apertures 49, 209 may further assist with supporting the proper orientation of the mating tube 200 onto the receiving tube 100. This may be particularly important in the event the receiving tube 100 is a tube having a flat surface and the coping 204 of the mating tube 200 is insufficient to properly position the orientation and angle of the mating tube 200 on the receiving tube 100. The position may otherwise be confirmed by aligning the positioning aperture 49 of the bent angle plate 40 with the positioning aperture 209 of the mating tube 200. A fastener, such as a rivet, may additionally be provided through the positioning apertures 49, 209 to maintain the mating tube 200 in position relative to the receiving tube 100. Additionally, or alternatively, a weld (e.g., a tack weld) may be applied for the same purpose.

Figure 23:
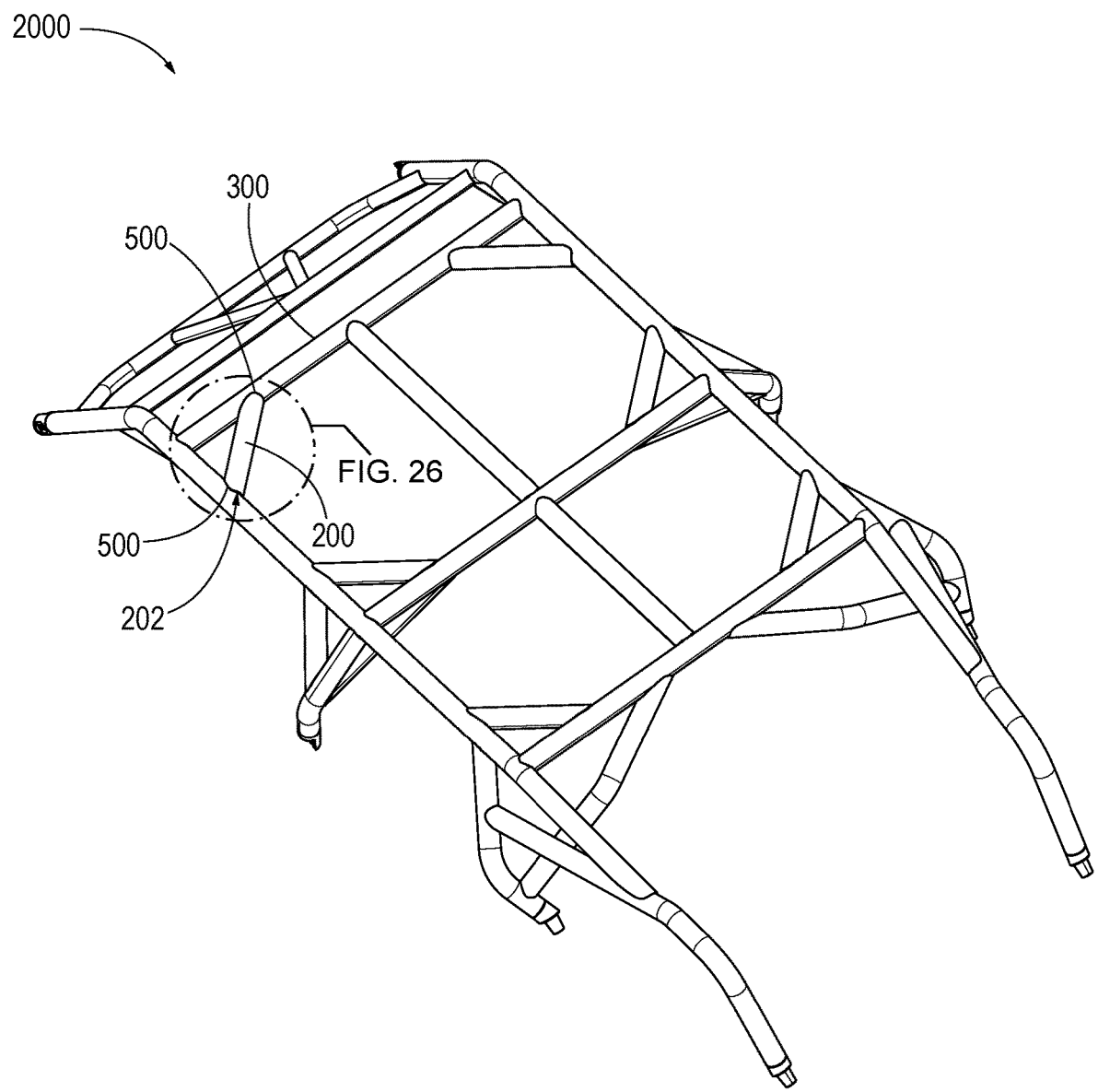
FIG. 23 is a top perspective view of a roll cage, in accordance with an example of the disclosure.

FIGS. 23-27 illustrate a particular example of a locator device 10 in a metal fabrication assembly that is a roll cage 2000. FIG. 23 illustrates an assembled roll cage 2000 with mating tubes 200 welded directly to receiving tubes 100 by welds 500 about the perimeter of the mating tubes 200 at the ends 202 of the mating tubes 200. FIG. 23 further illustrates where a mating tube may additionally have a connection as a receiving tube in a cross member 300, and vice versa. This simply illustrates the complexity that goes into the arrangements for a metal fabrication assembly, such as a roll cage 2000. Further, this illustrates why it is much more efficient to transport the components of the roll cage 2000 disassembled as opposed to attempting to transport a bulky fully assembled roll cage 2000. Hence, this illustrates the need to provide controls that the locator device 10 of the present disclosure provides for the subsequent assembly of the roll cage 2000 components within strict tolerances upon delivery of the individually fabricated components.

Figure 24:
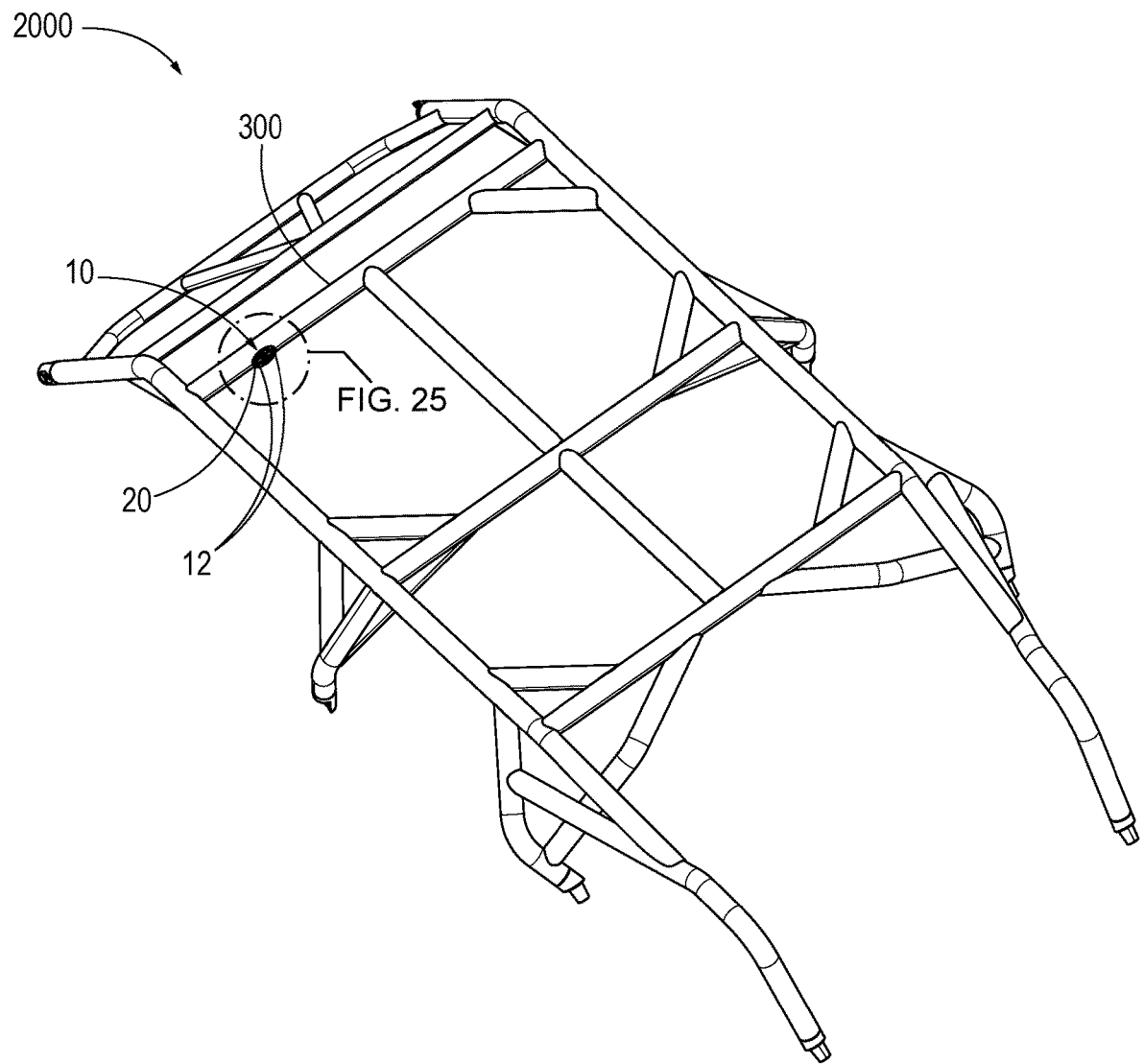
FIG. 24 is a top perspective view of a roll cage illustrating a locator device, in accordance with an example of the disclosure.
Figure 25:
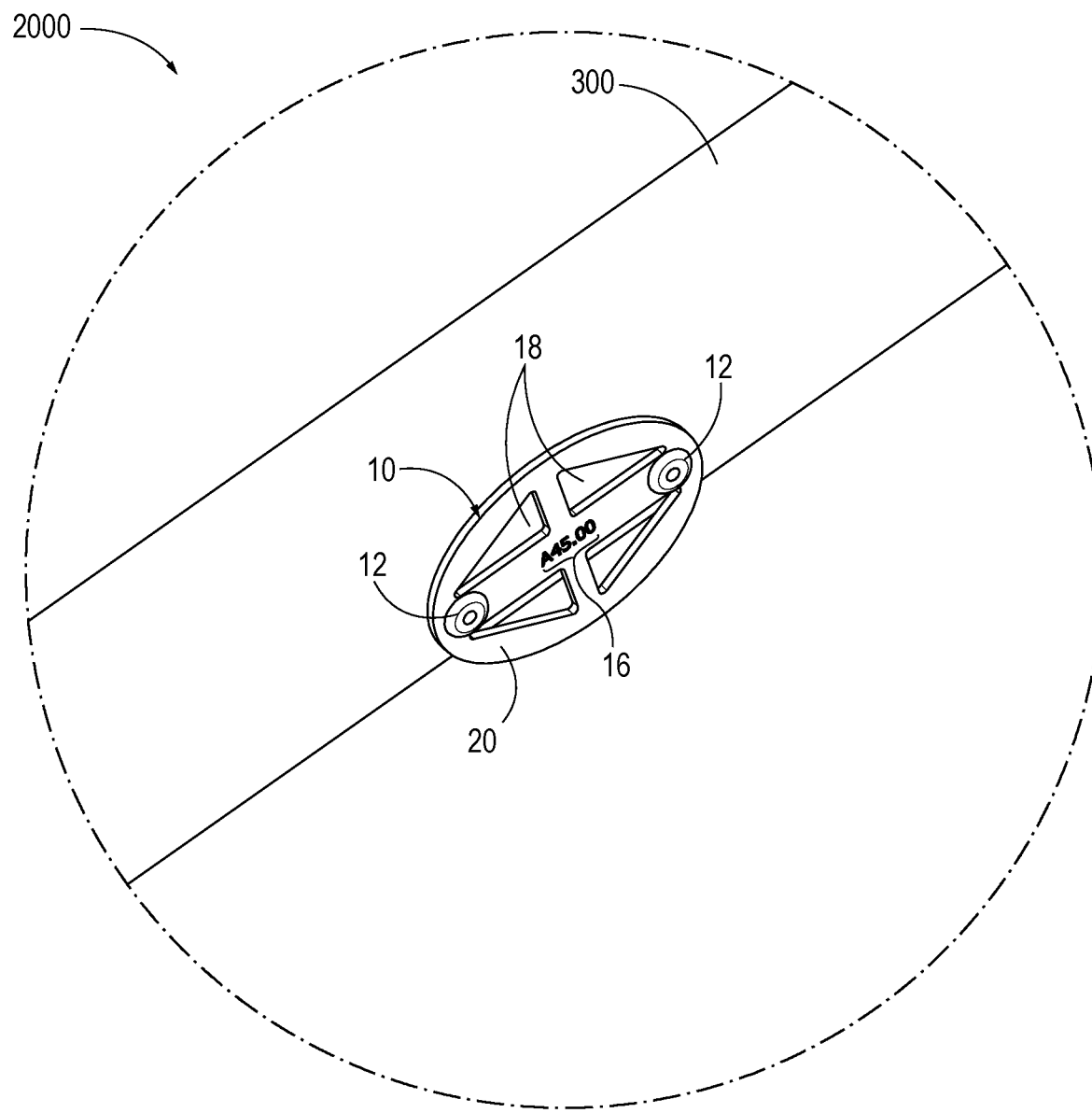
FIG. 25 is a partial view of a locator device on a roll cage taken at FIG. 25 of FIG. 24, in accordance with an example of the disclosure.
Figure 26:
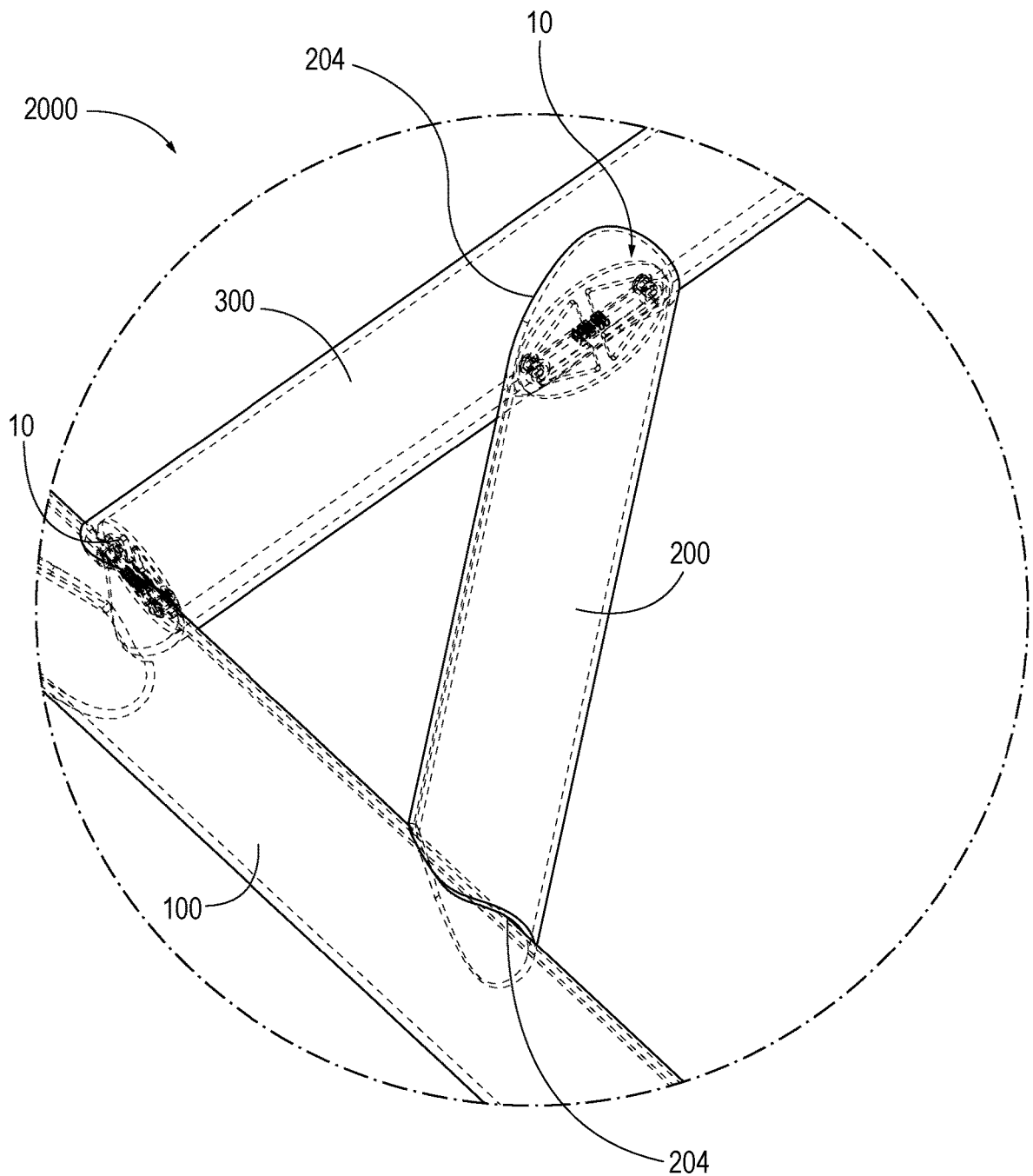
FIG. 26 is a partial view of a connection of a complex metal fabrication assembly taken at FIG. 26 of FIG. 23, in accordance with an example of the disclosure.
Figure 27:
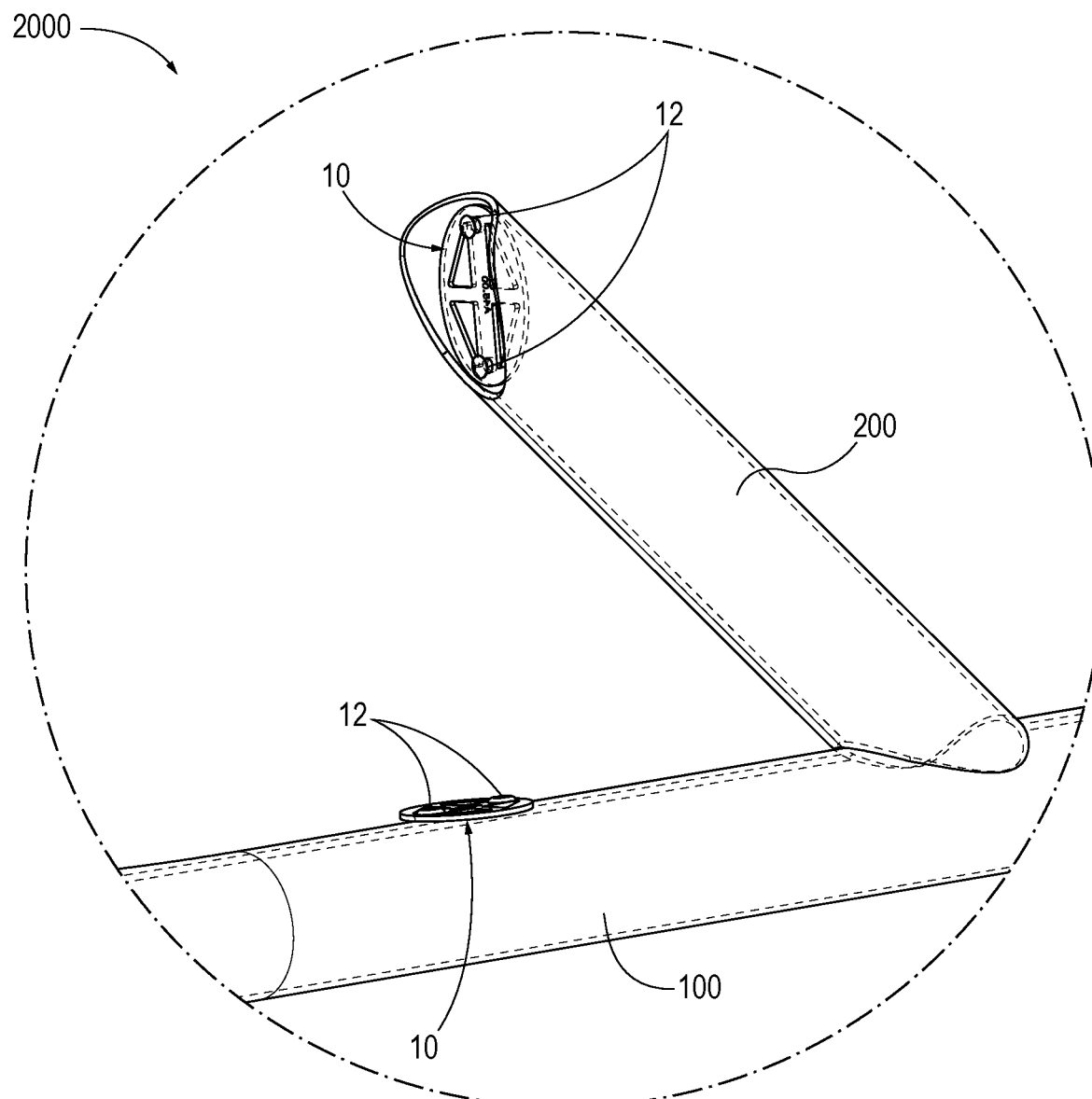
FIG. 27 is a partial view of a connection of a complex metal fabrication assembly taken at FIG. 26 of FIG. 23 with a receiving tube removed for illustrative purposes, in accordance with an example of the disclosure.

FIG. 24 illustrates the roll cage 2000 of FIG. 23 with a mating tube 200 removed from the assembly 2000. Concealed by the mating tube 200 of FIG. 23 was a locator device 10 comprising a flat plate 20 with fasteners 12 in FIG. 24. A partial view of the locator device 10 of FIG. 23 is further illustrated in FIG. 25. The locator device 10 is like those described above with flat plate 20 comprising a label 16 and light weighting apertures 18 with fasteners 12 fastening the flat plate 20 to the receiving tube, and in this case, a cross member 300 as further discussed below. FIG. 26 further illustrates a partial view of the roll cage 2000 of FIG. 23 with the hidden components illustrated by dashed lines. An arrangement of tube members is provided with locator devices 10 provided therein. FIG. 26 further illustrates that a locator device 10 need not be provided at each connection. By example, a connection between a receiving tube 100 and mating tube 200 is identified without a locator device. This is because a locator device 10 is positioned at the opposite end 202 of the mating tube 200. The provided single locator device 10 is sufficient to properly support and position the mating tube 200 on the corresponding tube 300 at both ends in view of the coping(s) 204 on the mating tube 200. This locator device 10 may be further supplemented to support the mating tube 200 by adding interference(s) as described above. Finally, FIG. 27 illustrates a partial view of the roll cage 2000 of FIG. 23 with a tubular cross member 300, that functions as both a receiving tube and a mating tube, removed for clarity and illustrative purposes. A locator device 10 is provided at the end of the removed tubular cross member and is fastened to a receiving tube 100 by fasteners 12. Another locator device 10 is provided within the mating tube 200 that otherwise intersects with the cross member 300 at an intermediate location. The locator device 10 positioned within the mating tube 200 would otherwise be fastened to the tubular cross member 300 by the fasteners 12.

The present disclosure also includes methods of manufacturing tubes for assembly in a metal fabrication assembly. In one example, the entire metal fabrication assembly may be created in modeling software such as, for example, 3D design software. The locator device of the present disclosure may be an 'iPart' in the design software that may simply be added and modified using design aids such as those described in view of FIG. 7 above. An 'iPart' is a master file for a family of parts that share geometry in common that may be tailored for a particular application, geometry, or arrangement in the metal fabrication assembly. The plate for a locator device may, therefore, be adaptable to any size or shape, as driven by user predefined fields that may comprise one or more of an angle, a tube diameter, and/or a tube wall thickness, by example. The engraving, or labeling, may also be applied to the locator device in similar manner.

Once the tube structures for the metal fabrication assembly is created in the modeling software, with the appropriate geometries (e.g., bends, angles, and orientations), the modeling software may utilize these details to present the tube members into a straight tube arrangement. The tube model details remain imported into the tube unfolding step of the software and represent the locator devices on the straight tube arrangements in a manner that they will be properly positioned after the tubes are returned to their complex geometric arrangement. Spring back and straight length elongation are applied to this process to ensure that all tubes will be bent perfectly, and all locator device positions are properly maintained based on the material properties.

With the modeling details in place the plate of the locator device is in condition to be cut by a laser cutter. The laser may be Fiber Laser which provides a clean cut with minimal burs. The laser cutter cuts the shape, the fastener apertures, the light weighting features, and the engraved labeling, based on the model parameters. Each of these conditions are precisely positioned in view of the detailed modeling parameters.

Also, with the modeling details in place, the tubes are in condition to be cut by a laser cutter. This is a process where a laser cutter cuts the tube perpendicular to the cut path. As noted above, the laser may be Fiber Laser which provides a clean cut with minimal burs. The laser cutter is relied on to cut all of the copings, cut all of the fastener apertures, and cut all of the engraved labels, based on the model. Each of these conditions are precisely positioned in view of the detailed modeling parameters and the placement of the tube being held by the laser cutter operating under the instruction by the modeling software.

The tubes may then advance to the CNC tube bender. The cut tubes are positioned within the CNC tube bender utilizing a reference point identified on the tube in conjunction with the CNC tube bender. The tubes are precisely bent once properly positioned within the CNC tube bender in view of the detailed modeling parameters of the modeling software.

For increased precision, the bent tube members may be further presented and compared to the straight tube format relied on in the modeling software only after the bent tubes have been formed. A laser scanner or a probing measurement system may be utilized to measure the completed bent tubes. The measured data is then compared to the straight tube format previously relied on in the modeling software to confirm accuracy. The tubes may be further modified, and this step repeated as required, to achieve a precise tube with the appropriate tube arrangement based on the modeling software. Once the tubes are completed to the requisite precision the correct locator device may be fastened (e.g., riveted) based on their labels and engravings as described in the examples above.

The present disclosure also includes methods of assembling tubes in a metal fabrication assembly. The method may include creating a kit of components for a metal fabrication assembly as described above in view of the methods of manufacturing tubes. The kit of components may comprise one or more receiving tubes and one or more mating tubes as described by the many examples herein. The kit of components may additionally comprise tubes having both receiving tube characteristics in combination with mating tube characteristics, as noted in view of the cross member example above. A receiving tube comprising one or more of the locator devices described above is positioned relative to a mating tube to be received on said receiving tube. The mating tube is forced into position on the receiving tube wherein a locator device plate that is fastened to a tangent line of the receiving tube is inserted into the internal void of the mating tube. When the mating tube is coped, the coping of the mating tube is further paired with the exterior sidewall of the receiving tube to properly orientate the mating tube. The exterior perimeter of the plate of the locator device may further assist with properly orientating the mating tube relative to the receiving tube. The mating tube is forced about the locator device plate until the end of the mating tube bias the exterior sidewall of the receiving tube. The locator device plate may comprise one or more interferences that may temporarily secure or hold, or even draw, the mating tube to the receiving tube. These steps may then be repeated in view of any additional receiving tubes and mating tubes until the metal fabrication assembly is completed. The adjoining receiving tubes and mating tubes may be welded together about a perimeter of the mating tube at the end of the mating tube. The weld permanently secures the mating tube to the receiving tube independent of the locator device. This may occur only after all of the receiving tubes are positioned relative to the mating tubes by way of the locator devices. Alternatively, this may occur intermittently as the mating tubes are being positioned at the receiving tubes by the locator devices as the metal fabrication assembly is being temporarily assembled. Once permanently secured, the locator devices are fully concealed by the respective receiving tube and the respective mating tube in the manner described by the examples herein.

While this invention has been described with reference to examples thereof, it shall be understood that such description is by way of illustration only and should not be construed as limiting the scope of the claimed examples. Accordingly, the scope and content of the examples are to be defined only by the terms of the following claims. Furthermore, it is understood that the features of any example discussed herein may be combined with one or more features of any one or more examples otherwise discussed or contemplated herein unless otherwise stated.

What is claimed is:

1. A metal fabrication assembly, the metal fabrication assembly comprising:
    a locator device;
    a mating tube; and
    a receiving tube;
    the locator device comprising a plate comprising a front surface, a back surface, and an exterior perimeter corresponding to an interior void of the mating tube, the plate fully inserted into the interior void of the mating tube and biasing an interior sidewall of the mating tube;
    the plate further comprising one or more fasteners inserted into one or more fastening apertures extending through the front surface and the back surface of the plate, the one or more fasteners mechanically securing the back surface of the plate to an exterior sidewall of the receiving tube;
    wherein a first end of the mating tube mates directly with the exterior sidewall of the receiving tube fully concealing the plate within the mating tube; and
    wherein the exterior sidewall of the receiving tube is an outer perimeter of the receiving tube.

2. The assembly of claim 1 wherein the locator device positions the mating tube of the metal fabrication assembly relative to the receiving tube of the metal fabrication assembly and the mating tube and the receiving tube are welded together with a weld directly between the mating tube and the receiving tube.

3. The assembly of claim 1 wherein the locator device is not a weld fixture.

4. The assembly of claim 1 wherein the exterior perimeter of the plate is less than or equal to an interior perimeter of the interior void of the mating tube of the metal fabrication assembly.

5. The assembly of claim 1 wherein the plate further comprises one or more light weighting apertures or light weighting recesses.

6. The assembly of claim 1 wherein multiple sections of the exterior perimeter of the plate are raised from the exterior sidewall of the receiving tube of the metal fabrication assembly when fastened to the receiving tube forming a void between the plate and the receiving tube.

7. The assembly of claim 1 wherein the plate is a flat plate.

8. The assembly of claim 1 wherein the plate is a partial tube with the front surface being concave and the back surface being convex.

9. The assembly of claim 1 wherein the plate is a partial tube inverted on the exterior sidewall of the receiving tube of the metal fabrication assembly.

10. The assembly of claim 1 wherein the plate is a bent angle having a leg extending from the front surface.

11. The assembly of claim 10 wherein the leg comprises a positioning aperture.

12. The assembly of claim 11 wherein a fastener is inserted through the positioning aperture of the leg for securing the plate to a positioning aperture of the mating tube of the metal fabrication assembly.

13. The assembly of claim 1 wherein the exterior perimeter of the plate comprises one or more interferences.

14. The assembly of claim 13 wherein the exterior perimeter of the plate is incrementally larger than an interior perimeter of the interior void of the mating tube providing an interference of the one or more interferences between the plate and the mating tube and holding the mating tube to the plate.

15. The assembly of claim 1 wherein the receiving tube of the metal fabrication assembly is round and the back surface of the plate is attached to the round receiving tube at a tangent of the round receiving tube and the one or more fasteners extend through the tangent.

16. A metal fabrication assembly comprising:
    a first locator device;
    a mating tube; and
    a first receiving tube;
    the first locator device comprising a front surface, a back surface, an exterior perimeter corresponding to an interior void of the mating tube;
    one or more fasteners inserted into one or more fastening apertures extending through the front surface and the back surface of the first locator device securing the back surface of the first locator device to an exterior sidewall of the first receiving tube;

wherein the first locator device is fully inserted into the mating tube and the exterior perimeter of the first locator device biases an interior sidewall of the interior void of the mating tube;

wherein a first end of the mating tube mates directly with the exterior sidewall of the first receiving tube fully concealing the first locator device within the mating tube; and wherein the exterior sidewall of the first receiving tube is an outer perimeter of the first receiving tube.

17. The metal fabrication assembly of claim 16 wherein the receiving tube is secured to the mating tube by a weld about an exterior perimeter of the mating tube and the exterior sidewall of the first receiving tube.

18. The metal fabrication assembly of claim 17 wherein the first locator device is separated from the weld by the mating tube.

19. The metal fabrication assembly of claim 16 further comprising a second locator device comprising a front surface, a back surface, an exterior perimeter corresponding to an interior perimeter of the mating tube;

one or more fasteners inserted into one or more fastening apertures extending through the front surface and the back surface of the second locator device securing the back surface of the second locator device to an exterior sidewall of a second receiving tube;

wherein the second locator device is fully inserted into the mating tube and the exterior perimeter of the first locator device biases an interior sidewall of the interior perimeter of the mating tube; and wherein the second end of the mating tube is opposite the first end of the mating tube and mates directly with the exterior sidewall of the second receiving tube fully concealing the first locator device within the mating tube.

20. A metal fabrication assembly comprising:

a locator device;

a mating tube; and a receiving tube;

the locator device comprising a front surface, a back surface, an exterior perimeter corresponding to an interior void of the mating tube;

one or more fasteners inserted into one or more fastening apertures extending through the front surface and the back surface of the locator device securing the back surface of the locator device to an exterior sidewall of the receiving tube;

wherein the locator device is fully inserted into the mating tube and the exterior perimeter of the locator device biases an interior sidewall of the interior void of the mating tube;

wherein a first end of the mating tube mates directly with the exterior sidewall of the receiving tube fully concealing the locator device within the mating tube, the receiving tube is secured to the mating tube by a weld directly between an exterior perimeter of the mating tube and the exterior sidewall of the first receiving tube, and the locator device is separated from the weld by the mating tube; and wherein the exterior sidewall of the first receiving tube is an outer perimeter of the first receiving tube.

\* \* \* \* \*